United States Patent
Zeltzer

(10) Patent No.: US 9,897,985 B2
(45) Date of Patent: Feb. 20, 2018

(54) ENERGY EXCHANGE SYSTEMS HAVING ACTUATORS WITH MULTI-PARAMETRIC CONTROL

(71) Applicant: David Zeltzer, Beer-Yakov (IL)

(72) Inventor: David Zeltzer, Beer-Yakov (IL)

(*) Notice: Subject to any disclaimer, the term of this patent is extended or adjusted under 35 U.S.C. 154(b) by 656 days.

(21) Appl. No.: 13/916,442

(22) Filed: Jun. 12, 2013

(65) Prior Publication Data

US 2014/0371913 A1    Dec. 18, 2014

(51) Int. Cl.

| | |
|---|---|
| G05B 21/00 | (2006.01) |
| G05B 13/00 | (2006.01) |
| G05B 15/00 | (2006.01) |
| G05D 23/00 | (2006.01) |
| G01M 1/38 | (2006.01) |
| G05B 13/04 | (2006.01) |

(52) U.S. Cl.
CPC .......... *G05B 15/00* (2013.01); *G05B 13/048* (2013.01); *G05B 2219/32021* (2013.01); *G05B 2219/45207* (2013.01); *Y02P 70/161* (2015.11); *Y02P 90/205* (2015.11)

(58) Field of Classification Search
USPC ......................................................... 482/57
See application file for complete search history.

(56) References Cited

U.S. PATENT DOCUMENTS

| | | | |
|---|---|---|---|
| 6,459,190 B1* | 10/2002 | Johansson ............. | H02N 2/021 310/316.01 |
| 8,332,071 B2 | 12/2012 | Zeltzer | |
| 2007/0184952 A1* | 8/2007 | Matsubara ....... | A63B 21/00178 482/142 |
| 2008/0248926 A1* | 10/2008 | Cole .................. | A63B 21/0628 482/5 |
| 2009/0055025 A1 | 2/2009 | Zeltzer | |
| 2010/0156333 A1 | 6/2010 | Chen et al. | |

(Continued)

FOREIGN PATENT DOCUMENTS

JP    2007112565 A    5/2007

OTHER PUBLICATIONS

International Search Report and Written Opinion dated Oct. 2, 2014 for PCT/IL2014/050515.

(Continued)

*Primary Examiner* — Mohammad Ali
*Assistant Examiner* — Md Azad
(74) *Attorney, Agent, or Firm* — Pillsbury Winthrop Shaw Pittman LLP

(57) ABSTRACT

A dynamic energy exchange platform is described that provides real time control of various system components by using regular sensors as well as sensorless actuators, resulting in an overall balance of energy for the entire system. A sensorless multi-parametric control solution may provide regular operation control, support control, and improvement control. The regular operation control comprises system control during normal operation. The support control comprises abnormal operation recovery control, and the improvement control allows potential system growth and/or controlling aging degradation. Embodiments of the disclosure encompass man-machine and machine-machine (or machine/material) interfaces with active points where energy exchange takes place.

20 Claims, 20 Drawing Sheets

(56) References Cited

U.S. PATENT DOCUMENTS

2011/0163704 A1 7/2011 Wang et al.

OTHER PUBLICATIONS

Lee, K.-B., Blaabjerg, F., "Improved Sensorless Vector Control for Induction Motor Drives Fed by a Matrix Converter Using Nonlinear Modeling and Disturbance Observer," Mar. 31, 2006, IEEE Transactions on Energy Conversions, vol. 21, No. 1, pp. 52-59.

* cited by examiner

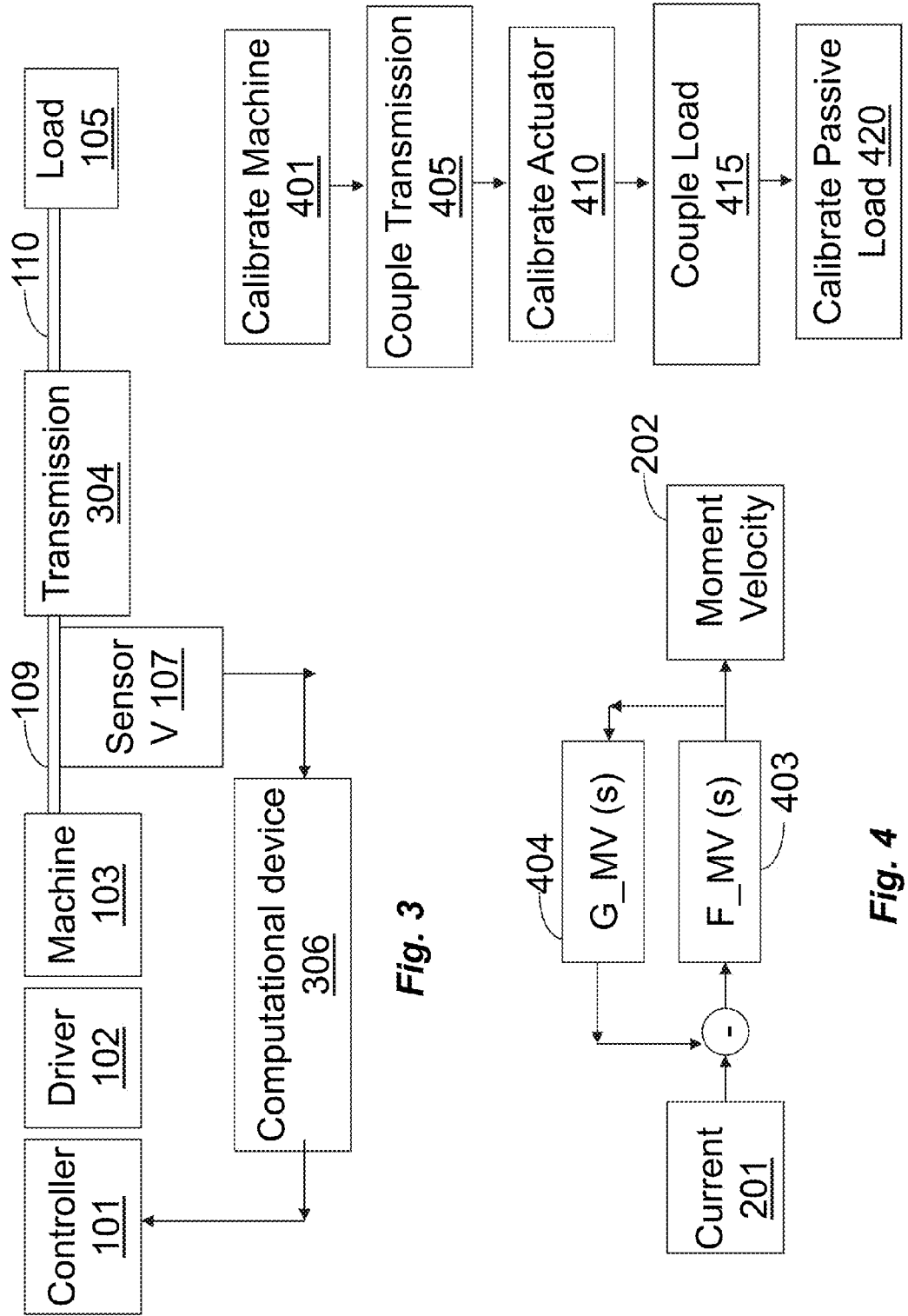

US 9,897,985 B2

ENERGY EXCHANGE SYSTEMS HAVING ACTUATORS WITH MULTI-PARAMETRIC CONTROL

FIELD OF THE DISCLOSURE

The present disclosure relates generally to energy exchange systems, and specifically to a dynamic platform for intelligently exchanging energy between system components utilizing multi-parametric control.

BACKGROUND

Control systems are used in various arts, such as mechanical systems, electrical systems, hydraulic systems, etc. For illustration, two examples of such systems are: a torsion system with controlled electric machine, reduction gear and angle transmission shaft for controlling robotic arm, and a pneumatic/hydraulic system with controlled electric pump, reduction valves system and a tube for controlling the robotic arm, etc. In fact, control systems may also be implemented over a machine-human arrangement, e.g., a human running on a treadmill, with the treadmill speed and elevation being controlled according to efforts exerted by the human. The load can be both passive (e.g., a drill in computer numerical control (CNC) device) and active (e.g., a human on a treadmill).

In this respect, the term "machine" or "engine" is generically used herein to describe an energy exchanger/energy converter, e.g., a controlled device which can be used both as a motor and/or as a generator. The motor uses current to produce velocity and moment, while generator uses velocity to produce current and voltage. Such energy converter can be described as two-parametric energy exchangers and provide power as product of two inter-related parameters. So, while the motor example uses velocity and moment, a fluid system, for example, may use flow rate and pressure. Importantly, the sensorless actuators relevant to this disclosure are those that can be characterized by two parameters. The term "current" in this respect, is a measure of some kind of energy flow, e.g., electric energy, chemical energy, etc. The multi-parametric energy exchanger is an extension of the two-parametric energy exchanger, as will be elaborated later in this disclosure.

The term transmission is used herein as a generic term applied to a transducer or a systems for transducing the energy produced by the energy exchanger. The transmission transduces a combination of values of the two parameters as output by the energy exchanger into another combination of values, which may or may not be the same as output by the energy exchanger. For example, the transmission may transduce some combination of velocity and moment into a different combination of velocity and moment. Transmission systems generally perform multiple functions, e.g., provide more moment at the expense of velocity or vice-versa via reduction gear, blocks system, valves, etc., and/or alter the geometry from lateral motion into rotation, rotation into lateral motion, change the angle of rotation, etc. The term "actuator," on the other hand, refers to the coupled machine-transmission arrangement, along with the control-drive mechanism.

To illustrate, the description proceeds with respect to electrical systems having an actuator comprising a motor shaft coupled to a transmission; however, the concept can be applied to other actuator systems as well. Control systems typically control the machine via a sensor positioned on a shaft between the machine and transmission system. Since in many applications it is crucial to control the moment and velocity applied to the load (i.e., moment and velocity on the transmission shaft), a constant mathematical model of the transmission is used and control is implemented on the machine shaft according to the model. However, performing control on the machine shaft poses certain limitations, including: the inconsistence of a physical transmission system with its model; time delays of the transmission system; dynamic changes in the transmission system and the load are inseparable; and, malfunctions are difficult to discover and correct.

To solve these limitations, an additional control is typically established based on a sensor positioned on the transmission shaft. The resulting control system is complex and hard to control due to the multitude of sensor inputs. Multiple sensor implementation also has limitations, including: price of the sensors; expensive control computations; slow control speed due to system complexity; hard to take corrective steps in case of malfunction due to system complexity. Moreover, in some situations there is a need to control the moment and/or velocity at the load, i.e., at the transmission shaft, but the conditions or design of the system do not enable placing a sensors on the transmission shaft.

FIG. 1 presents a typical design of a conventional system based on multiple sensors. Block 101, the controller, generates a signal that controls the driver 102. The signal issued by the controller 101 corresponds to a digital command from computational device 106. Driver 102 translates the signal of the controller 101 into a current that drives the machine (e.g., electrical motor, hydraulic pump, etc.) 103. Machine 103 generates velocity and moment at its output, as a result of the current it receives from the driver 102. Transmission 104 is coupled to the machine 103 via coupling 109, in this example, the transmission is connected to the motor via motor shaft 109. The transmission transduces the velocity and moment of the machine shaft 109 into different velocity and moment on the transmission shaft 110. Load 105 is subjected to the velocity and moment it receives through the transmission shaft 110. Generally, machine shaft 109 provides mechanical, hydraulic, etc., coupling between the machine 103 and the transmission 104, while transmission shaft 110 provides mechanical, hydraulic, etc., coupling between the transmission 104 and the load 105.

Computational device 106 receives its data from the sensors 107 and 108, executes calibration and control algorithms, and sends digital command to the controller 101. Velocity sensor 107 is positioned on the machine shaft 109. Sensor 107 gathers data regarding the velocity of the machine shaft 109 and sends information to the computational device 106. Sensor 108 is positioned on the transmission shaft 110, and is especially beneficial when the transmission ratio is changed significantly during operation.

FIG. 2 presents a typical design of a conventional control loop. The current 201 is the input of the control loop. The velocity and the moment on the load shaft 202 are the output of the control loop. The transfer function F_V1 (s) in block 203, models the velocity at the output of the machine shaft 109 as a function of the current 201. The velocity sensor 107 measures the actual velocity at the output of the machine shaft, which may differ from the velocity modeled by F_V1. The transfer function F_V2 (s) in block 204, models the velocity at the output of the transmission shaft 110 as a function of the velocity of the machine shaft 109. The velocity and moment sensor 108 measures the actual velocity at the output of the transmission shaft, which may differ from the velocity modeled by F_V2. The transfer function F_M2 (s) in block 205, models the moment at the output of the transmission shaft 110 as a function of the velocity of the transmission shaft 110. The velocity and moment sensor 108 measures the actual moment at the output of the transmission shaft, which may differ from the moment modeled by F_M2.

The control loop is closed via computation of three transfer functions, in order to reconcile the modeled and the actually measured parameters. Each of these functions is complex and requires extensive computations. The transfer function G_V1 (s) in block 206 closes the loop between the velocity at the output of the machine shaft 109 and the current 201. The transfer function G_V2 (s) in block 207 closes the loop between the velocity at the output of the transmission shaft 110 and the current 201. The transfer function G_M3 (s) in block 208 closes the loop between the moment at the output of the transmission shaft 110 and the current 201.

Generally, computational device 106 executes complex calculations to provide feedback that incorporates velocity measurement of sensor 107, and moment and velocity measurements of sensor 108. This leads to higher costs and lower reliability and response-time of the control system. Notably, since the control system attempts to correct for three independently measured parameters, the response time is sufficiently large that secondary and higher order effects become significant and makes precise control more difficult. Accordingly, it would be beneficial to provide a solution that enables simple and fast control, yet avoids the disadvantages associated with conventional control systems.

Controlling multiple parameters is a challenging problem in control systems. There are multiple conventional methods with inherent problems. The artificial intelligence methods, such as neural networks and fuzzy-logic, attempt to control the parameters in a form similar to human behavior in similar situation. The behavior of various parameters of the control system is reduced to complex combinations of more simple functions, and the algorithms are trained to achieve the behavior programmed by the designer. The construction and training process of these algorithms is both science and art, since the algorithms have to be selected and optimized for each specific problem. The behavior of the system controlled via artificial intelligence in abnormal situations can be unpredictable and unstable. These methods are usually applicable when there are sensors to give a feed back and provide a closed loop.

Another conventional method is prediction matrix. Prediction matrix methods are based on connecting all parameters and their derivatives via mathematical matrix. The future behavior of the system is predicted by analyzing the current behavior, and the prediction is later verified. The difference between the predicted and the measured value is called innovation. The innovation is used to adapt the system to changing environment. The mathematical design of these schemes is based on variations of the Kalman filter (sometimes referred to as linear quadratic estimation—LQE), including nested Kalman filters. These methods commonly experience the difficulty of adaptation based on innovation, since it is hard to attribute innovation to any one or several changes in measured parameters.

The off-line periodic method includes testing of different system parameters periodically, using system off-line internal and/or external instruments, when integration of on-line real time sensors is not technologically and/or economically effective. Real time controllability is provided at the actuator outputs (typically stations/centers) rather than at the system interface/delivery points. This loss of information and regulation ability at the system level (low testability and controllability of this current method) is follow by high risk factors and difficult decision process (decision is taken based on statistic methods with different risk factors) and results in low system effectiveness.

As such, new systems and methods are needed to manage energy balance between various components of an energy exchange platform to obviate the shortcomings of the current platforms. Furthermore, what is needed is to facilitate the energy exchange by designing intelligent control system that can dynamically control the flow of energy.

SUMMARY

The present disclosure describes various implementations of an energy exchange system, where flow of energy at active points at the interface of a plurality of system components/sub-components is controlled by multi-parametric control systems, at least some of the parameters of the multi-parametric control systems being extracted from sensorless actuators. Specifically, the energy exchange system may comprise a dynamic platform that imparts energy to and/or receives energy from a load that is connected to the platform. The load may be a human user (or a part of the body of a human user, such as a specific muscle group in a human body) creating a static or dynamic load condition. A notable feature of the energy exchange system is that the 'load' (e.g. a user) can return energy to the platform, so that energy balance is achieved at the active points. For example, a user may play the role of the source of energy that is imparted to the dynamic platform, i.e. the dynamic platform becomes the 'load.' This interchangeability feature enables superior control of the overall operation of the energy exchange system.

The multi-parametric energy exchanger is an extension of a two-parametric energy exchanger, where an overall control vector for the energy exchanger comprises a plurality of parameters representing all sources of energy applicable to the active point, i.e. the interface point through which energy exchange takes place. The sources of energy may include regular actuators with sensors, and one or more sensorless actuators, wherein each sensorless actuator is associated with a two-parametric domain, where one parameter is interrelated to another parameter, such that measurement of only one parameter is sufficient to predict an output of the sensorless actuator. This feature helps in reduction of number of sensors in the system, as predefined parametric curves can be used to predict a value of a parameter without actually having to measure that parameter with a dedicated sensor.

The following summary of the disclosure is included in order to provide a basic understanding of some aspects and features of the disclosure. This summary is not an extensive overview of the disclosure and as such it is not intended to particularly identify key or critical elements of the disclosure or to delineate the scope of the disclosure. Its sole purpose is to present some concepts of the disclosure in a simplified form as a prelude to the more detailed description that is presented below.

Aspects of the disclosure cover the regime of predictive control. The problem of increasing controllability and decreasing risk factor is solved by integrating sensorless two-parametric actuators into the full control system by sensorless multi-parameter control method which provides real time control of main system level required parameters utilizing predefined performance curves, periodic calibration as well as data collected/derived in real-time.

According to one aspect of the disclosure, a sensorless multi-parametric control solution may provide operation control, support control, and improvement control. The operation control comprises system control during normal operation. The support control comprises abnormal operation recovery control, and the improvement control allows potential system growth and/or compensating for degradation over time due to usage and/or environment.

The system presented in this disclosure is more accurate than the conventional systems since the moment and velocity on the load axis are calculated utilizing the inventive methods and algorithms of calibration, adaptation, prediction and verification. The price and complexity of the proposed system in its various embodiments is typically lower than the price and complexity of its alternatives, since there is no dedicated velocity and moment measurements on the transmission axis and no complex feedback configuration requiring complex mathematic calculation within different time-delays in dynamic regime. The resulting system has a very fast response time, so that higher order effects are not significant.

Embodiments of the disclosure encompass man-machine and machine-machine interfaces, including machine-material interface.

In particular, this disclosure describes a mechanical energy exchange system, the system comprising a first component and a second component transferring mechanical energy to each other at one or more active points at an interface of the first component and the second component to achieve overall energy balance in the system, the first component comprising: at each of the one or more active points, one or more sensorless actuators coupled to the active point; and, a controller for calculating a control vector based on multiple parameters to dynamically determine an operational mode of the mechanical energy exchange system, wherein the multiple parameters include two characteristic inter-related parameters per sensorless actuator.

The multiple parameters may be arranged in a control data matrix to calculate the control vector to determine the operational mode. A feedback loop may be used to recalculate the control vector, wherein the feedback loop includes real-time data collected from the system.

The operational mode of the mechanical energy exchange system may be updated by selecting one of a plurality of predetermined multi-parametric calibration curves stored in the system that matches a detected load condition, wherein the calibration curves are periodically updated.

The calibration curves may be generated by performing periodic static load calibration, the static load being varied to collectively span an operational regime in a dynamic load condition.

The multi-parametric calibration curve may represent a relationship between two characteristic interrelated parameters, such that dynamic measurement of only one parameter is sufficient to determine the amount of mechanical energy to be exchanged by a sensorless actuator at a particular active point.

The two interrelated parameters may be plotted in four quadrants spanning a two-parametric space.

In yet another aspect of the disclosure, a dynamic platform is disclosed for intelligently exchanging mechanical energy with a load, wherein each of the sensorless actuators coupled to active points at the platform-load interface comprises a machine coupled with a mechanical transmission system, wherein the mechanical transmission system carries at least a portion of the mechanical energy produced by the machine at the active points. A controller dynamically controls the operation of the sensorless actuator according to an adaptive methodology that determines the control vector for each active point based on a detected load condition at that point.

These and other objects, features and advantages of the present disclosure will become fully appreciated as the same become better understood when considered in conjunction with the accompanying detailed description, the appended claims, and the accompanying drawings.

BRIEF DESCRIPTION OF THE DRAWINGS

The accompanying drawings, which are incorporated in and constitute a part of this specification, exemplify embodiments of the present disclosure and, together with the description, serve to explain and illustrate principles of the disclosure. The drawings are intended to illustrate various features of the illustrated embodiments in a diagrammatic manner. The drawings are not intended to depict every feature of actual embodiments nor relative dimensions of the depicted elements, and are not necessarily drawn to scale.

FIG. 3 illustrates a system according to an embodiment of the disclosure.

FIG. 4 illustrates a control loop according to an embodiment of the disclosure, while FIG. 4A illustrates a flow of a calibration process.

DETAILED DESCRIPTION

Figure 1:
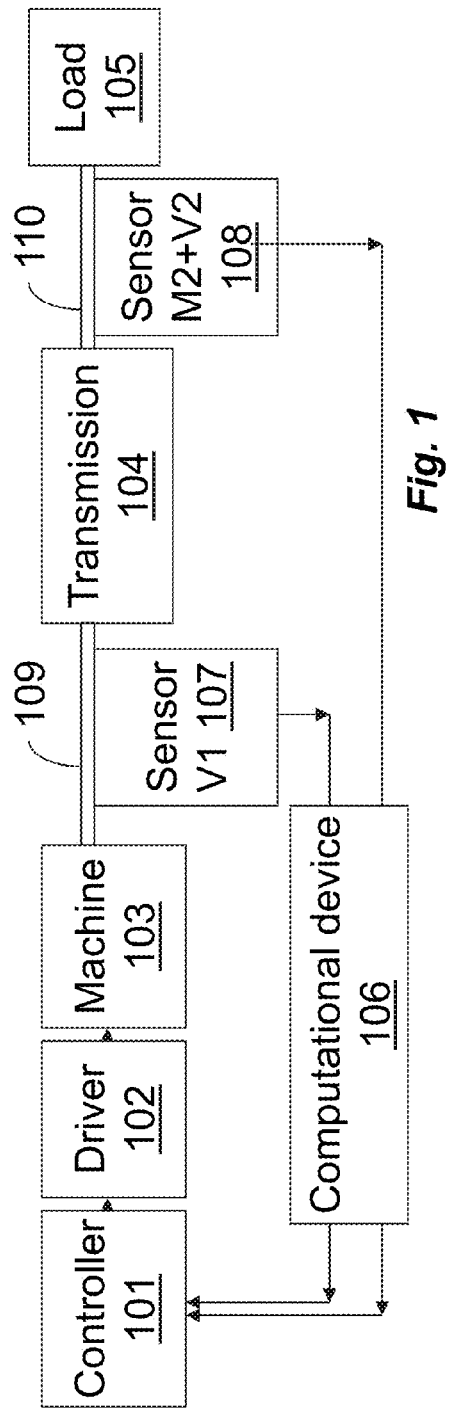
FIG. 1 illustrates a typical design of a conventional system based on multiple sensors.
Figure 2:
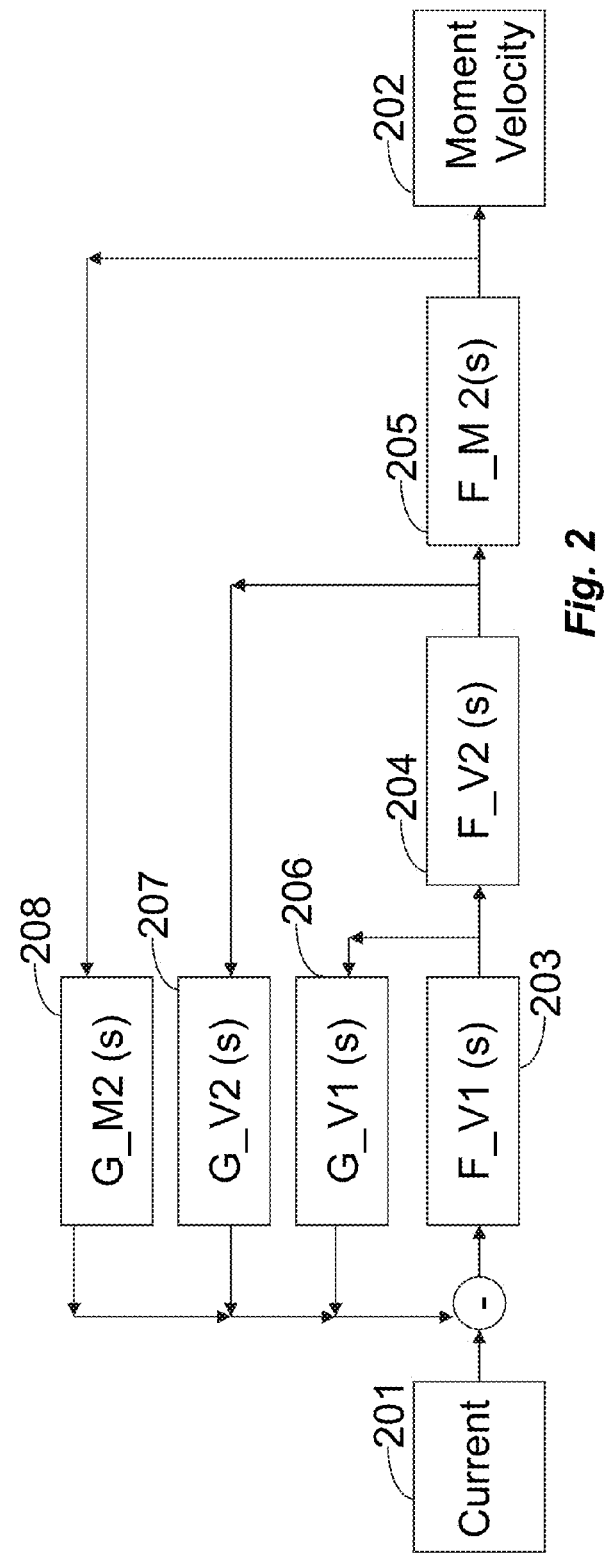
FIG. 2 illustrates a typical design of a conventional control loop.

The present disclosure will now be described in detail with reference to the drawings, which are provided as illustrative examples of the disclosure so as to enable those skilled in the art to practice the disclosure. Notably, the figures and examples below are not meant to limit the scope of the present disclosure to a single embodiment, but other embodiments are possible by way of interchange of some or all of the described or illustrated elements. Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the disclosure is intended to encompass other embodiments including a plurality of the same component and/or a plurality of sub-components, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

In general, embodiments of the disclosure provide a number of different features and advantages that advance the state of the art of energy exchange platforms. These features and advantages are provided via a combination of one or more features/services, implemented in software and appropriate hardware interface to execute the software.

The granted U.S. Pat. No. 8,332,071, contents of which are incorporated herein in their entirety by reference, describes the basic paradigm of the sensorless actuator and method for calibration and control of the actuator. As it is well known, force or moment is a major parameter in any actuator. Movement or displacement (with velocity or acceleration) is the direct outcome of applying force. In most conventional systems, the measurement of force is not direct but is calculated based on measuring displacement on the basis of physical or engineering correlations using different measurement settings.

The present system also utilizes this principle, using a controlled engine with a velocity sensor on the engine hinge. The system retrieves the central parameter of force or moment on the engine hinge by building a static scale (constant velocity prior to change in velocity based on dynamic load condition) of force/moment on the controlled engine hinge depending on the voltage applied. Later this scale is used on the transmission hinges. One major advantage that is derived from the described control system is the ability to indirectly measure the force that the user exerts on the engine, or vice versa, i.e. the force the engine exerts on the user. This is achieved using the calibration or scaling data of the engine which enables the actuator to become a measuring machine. The indirect measurement takes place at active points on the interface between the load and the transmission.

Many different applications are envisioned for this controlled system.

One of the applications involve man-machine interface, such as wheel chairs for training/rehabilitation (the wheel chair is placed on a platform rail such that the force that the user exerts when turning the wheels is measured and may even be objected by a counter force); treadmills for ergonometric tests and for gyms; bicycles for gyms; robotic hands for warehouses; robotic platform for physical therapy etc.

Another application is a machine-machine interface. A non-limiting example is a simulator for car engines, where the sensorless actuator is used for measuring the performance and the actual force that a car engine produces, as well as the engine with the transmission at the contact point of the wheels with the road.

Another application can be a machine-material interface, such as water delivery valves, etc.

A complex system may include a combination of man-machine and machine-machine (and/or machine-material) interfaces. Also, a complex system may have parts that are not exchanging purely mechanical energy, but may include other types of energy independently or in combination with mechanical energy. Examples of other types of energy are electrical energy, pneumatic energy, hydraulic energy, chemical energy etc.

Embodiments of the disclosure also provide for multiple-parameter control for energy exchange systems including sensorless actuators (and other system components), the multiple parameters being arranged in a matrix form in certain embodiments. The integration of the sensorless actuators allows multi-parameter dynamic compensation of internal and external effects that cause deviation from normal system behavior, as well as variation of control signal based on load dynamics. One non-limiting illustrative example of a system where multi-parameter control is useful is in electromechanical multidirectional system, such as a robotic arm with multiple joints that do not have sensors at the points where the forces are applied. Another example is energy balance in a multi-sourced systems, i.e., more than one energy sources are applied at the points of action. Active/passive systems, such as motor-vehicle systems with different power actuators and transmissions to the wheels (e.g., hybrid cars) and without force sensors at the point of wheels contacts with the road are other examples of a system having multi-parametric control.

The multi-parameter control system may also be applied to a hydro-chemical system with separate actuators for chemical materials, temperature control, liquid flow, etc.

Some specific practical implementation of the present system include (only as illustrative examples):

Treadmill—comprises regular construction and transmission and sensorless actuator in place of regular motor/driver/display;

Bicycle exerciser—comprises regular construction and transmission and sensorless actuator in place of flywheel;

Rowing machines, steppers, elliptic machines and other force machines with different functions of force vs distance, that provide situations equivalent to different regular movement (many of these activities can be combined in a multi-trainer);

Vehicle simulator—vehicle wheels move on one or two rolls and the contact area provides the "work point" for road simulator/testing component that comprise sensorless actuator with rolls and vehicle drive system, including wheel, transformed to sensorless actuator configuration component in accordance with the present disclosure.

The common feature of all of the above configurations is that there are multiple real time unknown parameters associated with the "work points", generally required for system mission, system operation and quality control. The terms "work point" and "active point" may have been used interchangeably in the specification, but persons skilled in the art will recognize that the scope of the invention is not limited to force being applied directly at the "work point" and energy exchange is also happening at the same "work point." In other words, force being applied to a work point may cause energy exchange at the same or a different "work point." Typically, in conventional systems, the missing information/unknown parameters decrease the effectiveness of the control system, especially in dynamic systems. However, using embodiments of the disclosure, improved real-time control of such dynamic systems is enabled. The inventive multi-parameter control system includes system level control mechanisms with one or more sensorless actuators, such as those described herein, integrated as sub-systems.

FIG. 3 presents a typical design according to an embodiment of the disclosure. While the illustrated embodiment seems similar to the conventional system, in this embodiment only a single sensor is used and the computational device 306 performs very different function than the computational device 106, thus reducing system price and complexity, while increasing its response and reliability. Due to the function of the computational device 306, the control of characteristics on the transmission shaft 110 does not require the conventional sensor 108. The computational device 306 is typically a digital (but may be analog) computer, and may include one or an array of microprocessors performing computation of the control based on sensor inputs and the control process.

FIG. 4 presents a control loop according to an embodiment of the disclosure. The control loop itself is very simple. The transfer function F_MV(s) in block 403, models the moment and the velocity at the output of the transmission shaft 110 as the result of the current in the input of the machine 103. The transfer function G_MV(s) in block 404 closes the control loop. The simplification of the control loop requires calibration methods different from conventional systems.

FIG. 4A illustrates a calibration process according to an embodiment of the disclosure. In step 401 machine calibration is performed. A machine set of curves calibration is generated once, prior to system assembly, i.e., prior to coupling a transmission to the machine. This provides a set of stable and highly repeatable curves that are locked and stored. For that, high accuracy velocity and moment measurement equipment is attached directly to the machine shaft, and moment and velocity scale verification is perform with different control signals. This calibration step allows characterization of the machine in the control equation.

In step 405 the transmission is coupled to the machine and in step 410 an actuator (i.e., machine+transmission) calibration is performed. This calibration provides information relating to internal loses of the actuator and allows predicting the control loop behavior for each working point in the range of actual working points of the system. Since the sensorless actuator behavior can change over time, this procedure is performed also as periodic calibration. The values of the working points can be used to dynamically update the control model of the actuator.

In step 415 a static load is coupled to the transmission shaft and in step 420 passive load calibration is performed to enable adding loaded transmission and/or passive load characteristics into the feedback. This calibration step provides information relating to external loses of the system. The passive load is applied to the transmission by opening the active work point interface (if a load is human being, asking a man not to strain his muscles act as passive load).

The control process itself is adaptive. The computation system uses the calibration results to calculate the derivative (typically not more than the first two derivatives) of the velocity (seldom moment) as reported by the sensor. Using the transmission with initially-known velocity ratio, the transmission moment and its derivatives are calculated. The derivatives are then normalized by target speed and moment. The active load moment is calculated from dynamic load effects.

The velocity and the moment attributed to the dynamic model are stored for statistics and improvement. For example, a man can be presented with his muscular velocity and moment along the time axis and the amount of the active power (work) applied. Unlike other control methods, the inventive system presents accurately values and statistics without using additional sensors.

Figure 5:
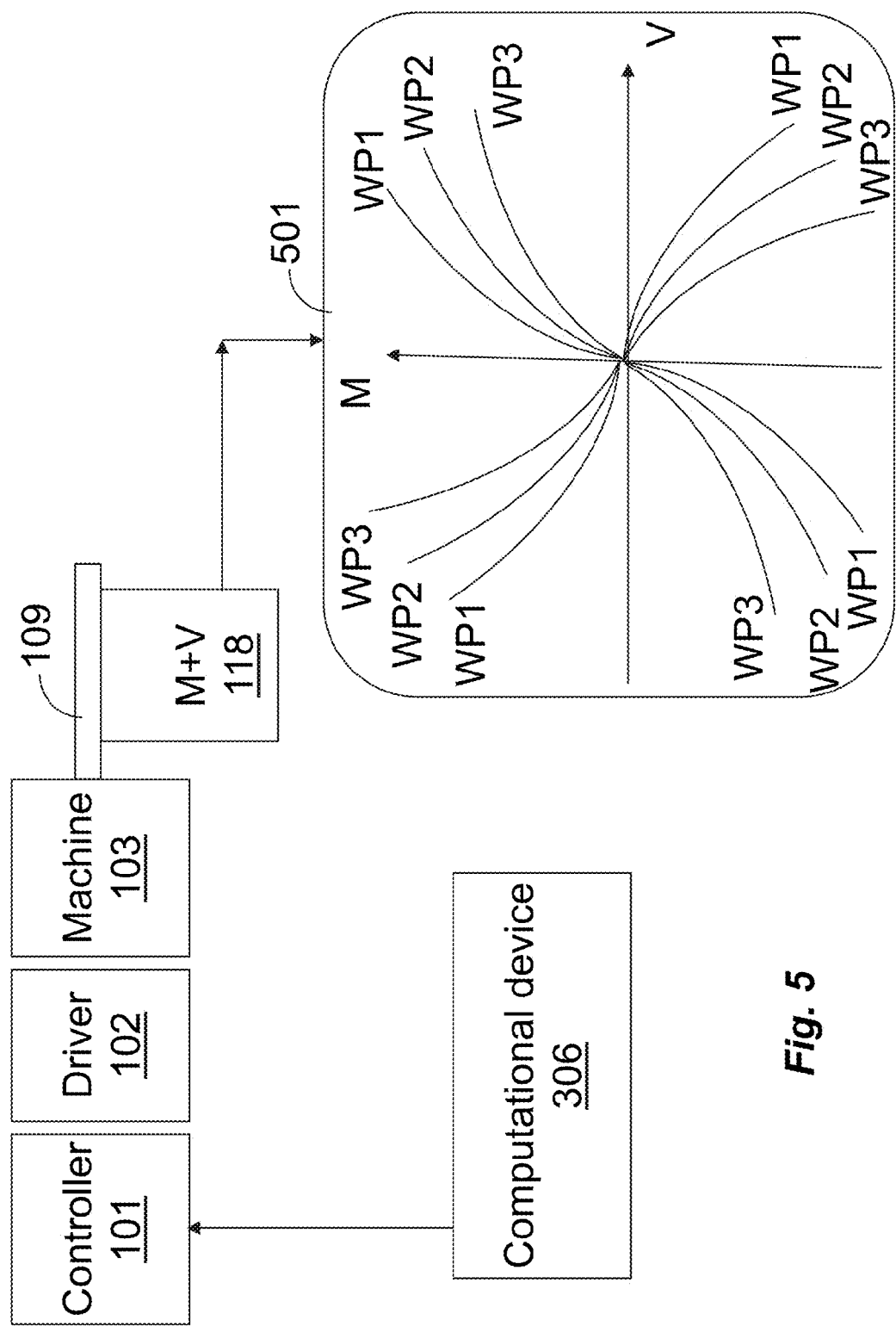
FIG. 5 illustrates a machine curve calibration system and method according to an embodiment of the disclosure.

FIG. 5 presents a typical machine setup for curves calibration system, according to an embodiment of the disclosure. The machine curves calibration is a part of the system production process and is performed prior to coupling the machine to the transmission. The working conditions set of the machine curve is fixed separately in four application quadrants, covering both a motor and generator operations:
    Quadrant 1: Positive moment and positive velocity;
    Quadrant 2: Positive moment and negative velocity;
    Quadrant 3: Negative moment and positive velocity;
    Quadrant 4: Negative moment and negative velocity.
    In each quadrant, a different set of machine curves is expected.

Figure 6:
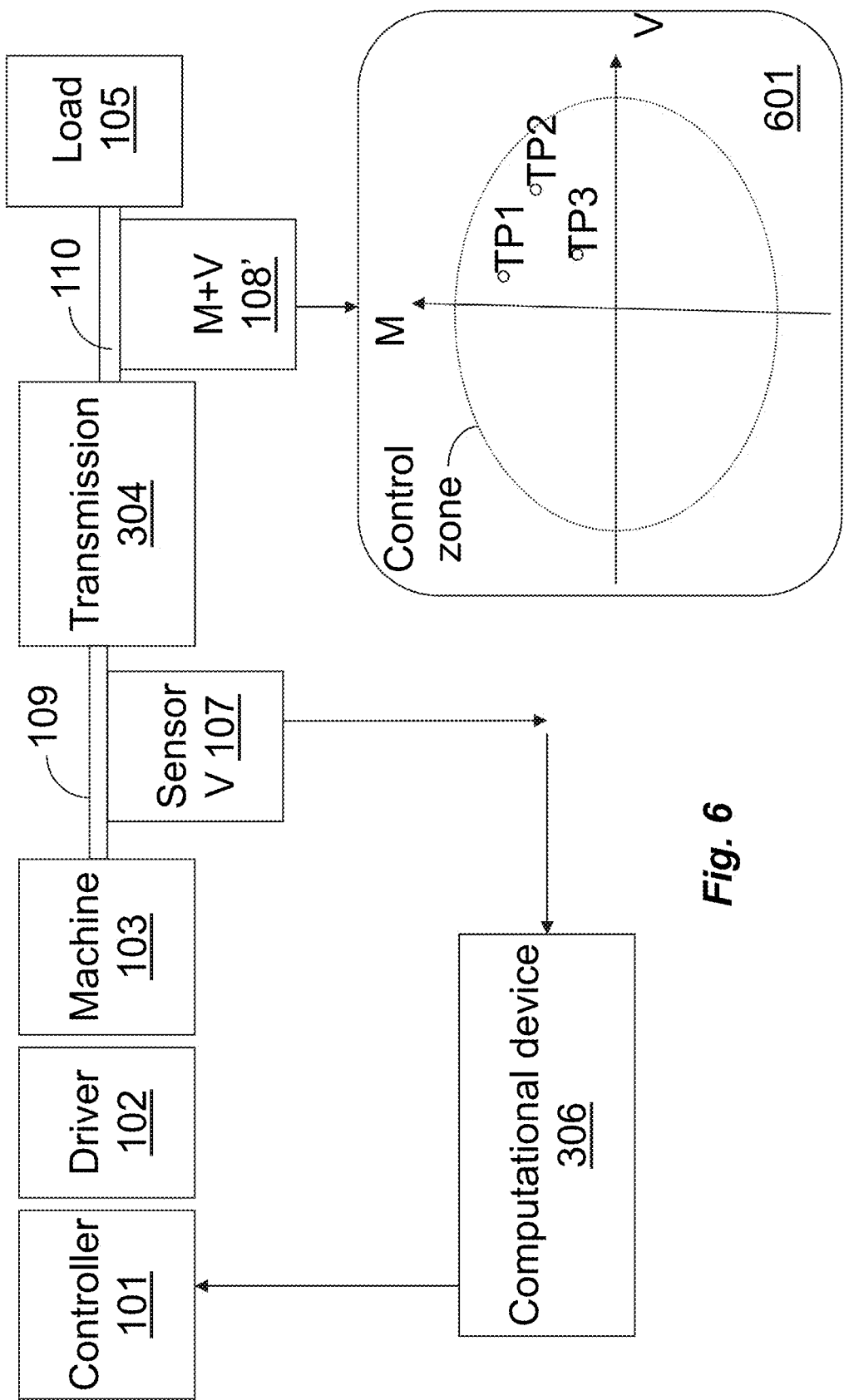
FIG. 6 illustrates a sensorless actuator as a measurement device according to an embodiment of the disclosure.

FIG. 6 illustrates a sensorless actuator calibration system according to an embodiment of the disclosure. The plot in box 601 shows the control zone and selected test points (TP1-TP3 are example test points—any number of test points can be selected). The control zone of 601 is the range of velocities and moments that should be controlled in normal operation, by the design of the particular application. The moment at the open transmission shaft 110 is set to zero (0), and different movements are simulated by applying different currents to the motor. Then, the coefficients of the algorithms, with only motor and internal losses components, in computation device 306 are varied until physical motion of transmission stops. These coefficients are recorded and fixed for the operation phase so as to provide information related to internal losses of the actuator. This periodic calibration may need to be repeated each time then actual physical environment is changed.

Figure 7:
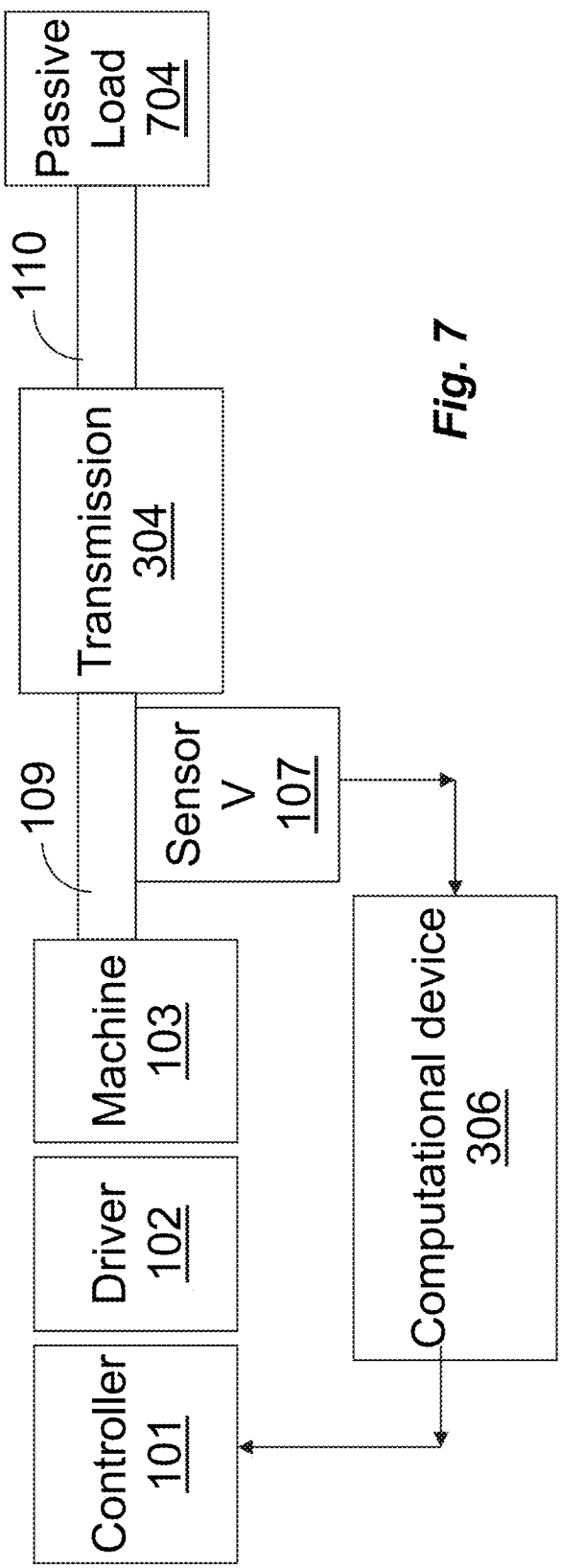
FIG. 7 illustrates a sensorless actuator and a passive load calibration system and method according to an embodiment of the disclosure.

FIG. 7 also illustrates a typical passive load calibration system according to an embodiment of the disclosure. The system is equivalent to the working system 3, except for the load 701, which, unlike the load 105, is totally passive. For example, if the load is a human, he is asked not to actively engage the mechanical interfaces. The moment at the transmission shaft 110 is set to zero (0), and different movements are simulated by applying different currents to the motor. Then, the coefficients of the algorithms, with out dynamic load components, in computational device 306 are varied until physical motion of the transmission stops. These coefficients are recorded and fixed for the operation phase so as to provide information relating to external losses of the actuator system. This pre-operation calibration may need to be repeated each time the actual physical load is changed.

The main static transduction ratio between the parameter, i.e. velocity, on the transmission shaft 110 and the parameter, i.e. velocity, on the machine shaft 109, is a-priori available through supplier information and/or prior measurement of similar systems. This transduction ratio is dynamically updated as the system enters actual usage. That is, the transduction ratio is taken as a contact only in the initial activation of the actuator.

Figure 8:
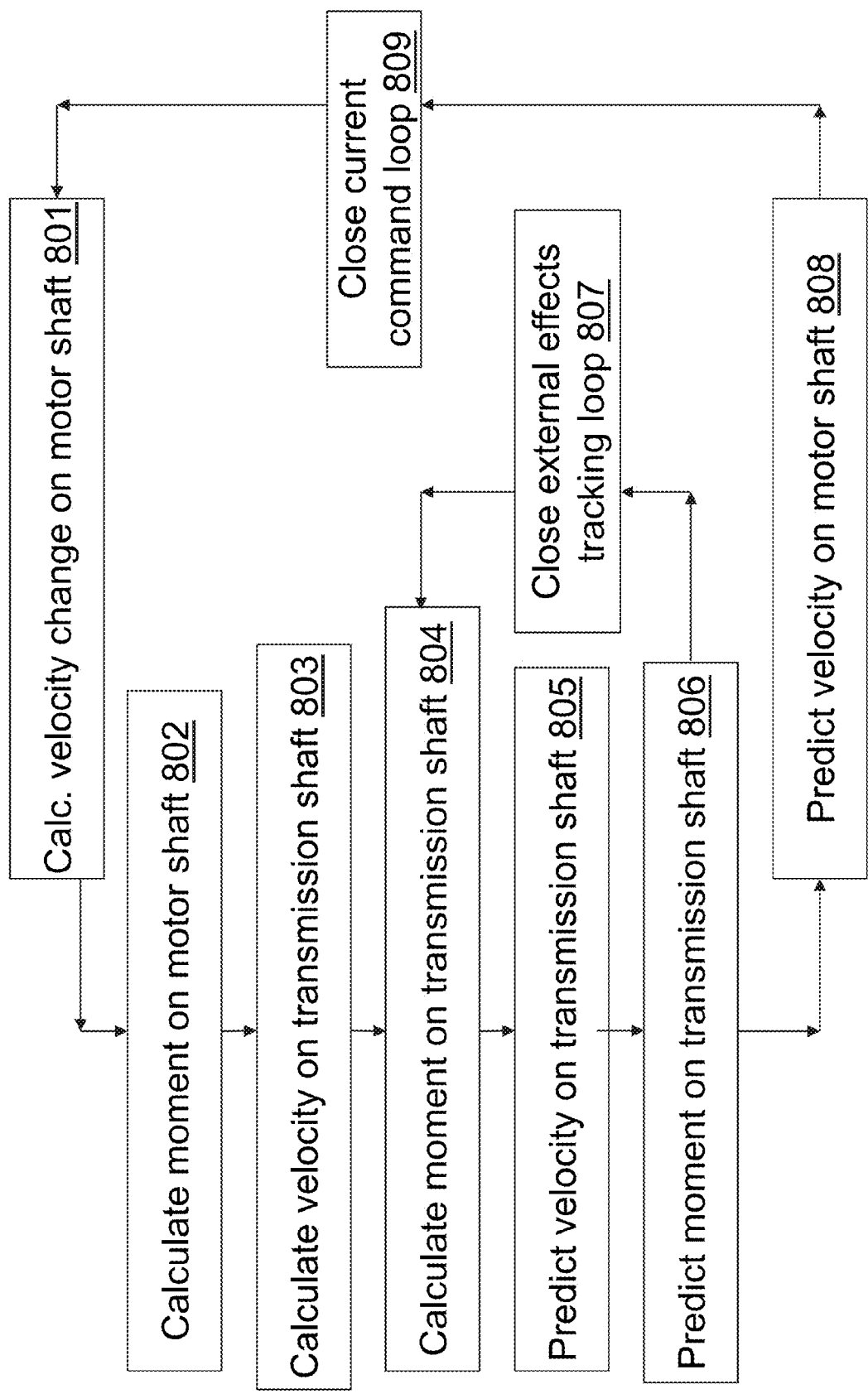
FIG. 8 illustrates a typical design of the proposed control algorithm according to an embodiment of the disclosure.

FIG. 8 illustrates an example of a control process executed in computational device 306, for the system illustrated in FIG. 3, with control loop illustrated in FIG. 4. In Step 801 the change of velocity on motor shaft $\Delta V|act$ is calculated taking the currently measured velocity of sensor 107 and subtracting from it the previous velocity measurement. In Step 802 the change of moment on motor shaft $\Delta M|act(\Delta V|act)$ is obtained using one of the constant curves measured during calibration of FIG. 5. In this respect, the notation $\Delta M|act(\Delta V|act)$ means change of moment, $\Delta M|act$ as a function of change of velocity, $\Delta V|act$. It should be appreciated that the selection of the curve depends on the mode of operation of the machine. For example, one may select to operate the machine following a single curve, say curve WP3 in FIG. 5. In such operation, varying the two parameters of the energy exchanger (e.g., the motor) is performed mainly by the transmission transducing those parameters. Conversely, one may elect to control the parameter by varying the modes of operation of the machine, and fix the transmission to operate in a single transducing ratio. For example, one may operate the machine by moving among the three curves shown in FIG. 5, thereby analogizing the operation of the machine as if coupled to a three speed transmission, even when the transmission is fixed to a single transfer ratio. Of course, one may operate the actuator in any combination of machine modes and transmission ratios. In fact, using the machine modes one can use a simple 1:1 transmission ratio.

In Step 803 the change of velocity on transmission shaft $\Delta V|trans (\Delta V|act)$ is calculated using the a priory known (in the initial stage) or updated (in subsequent stage) transmission ratio. In Step 804 the change of moment on transmission shaft is calculated using the equation:

$$\Delta M|trans(\Delta V|trans) = \Delta M|act(\Delta V|trans) + \Delta M|sysloss(\Delta V|trans) + \Delta M|exteff(\Delta V|trans),$$

where the system (internal) losses ($\Delta M|sysloss$) and the external effects ($\Delta M|exteff$) are known from calibration described with respect to FIG. 7. In Step 805 the velocity on the transmission shaft $\Delta V'|trans$ is predicted using prediction model of transfer function $F\_MV(s)$ of FIG. 4, based on previous results of $\Delta V|trans$ and its derivatives. In Step 806 the moment on the transmission shaft $\Delta M'|trans$ is predicted using the equation:

$$\Delta M'|trans(\Delta V'|trans) = M|act(\Delta V'|trans) + \Delta M|sysloss(\Delta V'|trans) + \Delta M|exteff(\Delta V'|trans).$$

In Step 807 external effects tracking loop is closed using $\Delta M'|trans (\Delta V'|trans)$ and $\Delta M|trans (\Delta V|trans)$ results. The difference between the predicted moment and calculated moment is attributed to external effects:

$$\Delta M|exteff(\Delta V'|trans) = \Delta M'|exteff(\Delta V'|trans) + (\Delta M|trans(\Delta V'|trans) - \Delta M'|trans(\Delta V'|trans)).$$

In Step 808 the velocity on motor shaft $\Delta V'|act$ is predicted based on $\Delta V'|trans$ and results of calibration described on FIG. 6. Step 808 is an inverse of 803, but using corrected transmission velocity. In Step 809 the current command loop $\Delta I$ is closed. The current command from computational device 306 to deriver 102 results in changes of $\Delta V|act$ and allows elimination of discrepancies between $\Delta V|act$ and $\Delta V'|act$. The target velocity $V|act$ is used to calculate the desired $\Delta V|act$. After completion of Step 809, Step 801 is executed again using a newly measured machine velocity, closing the control loop.

Figure 9:
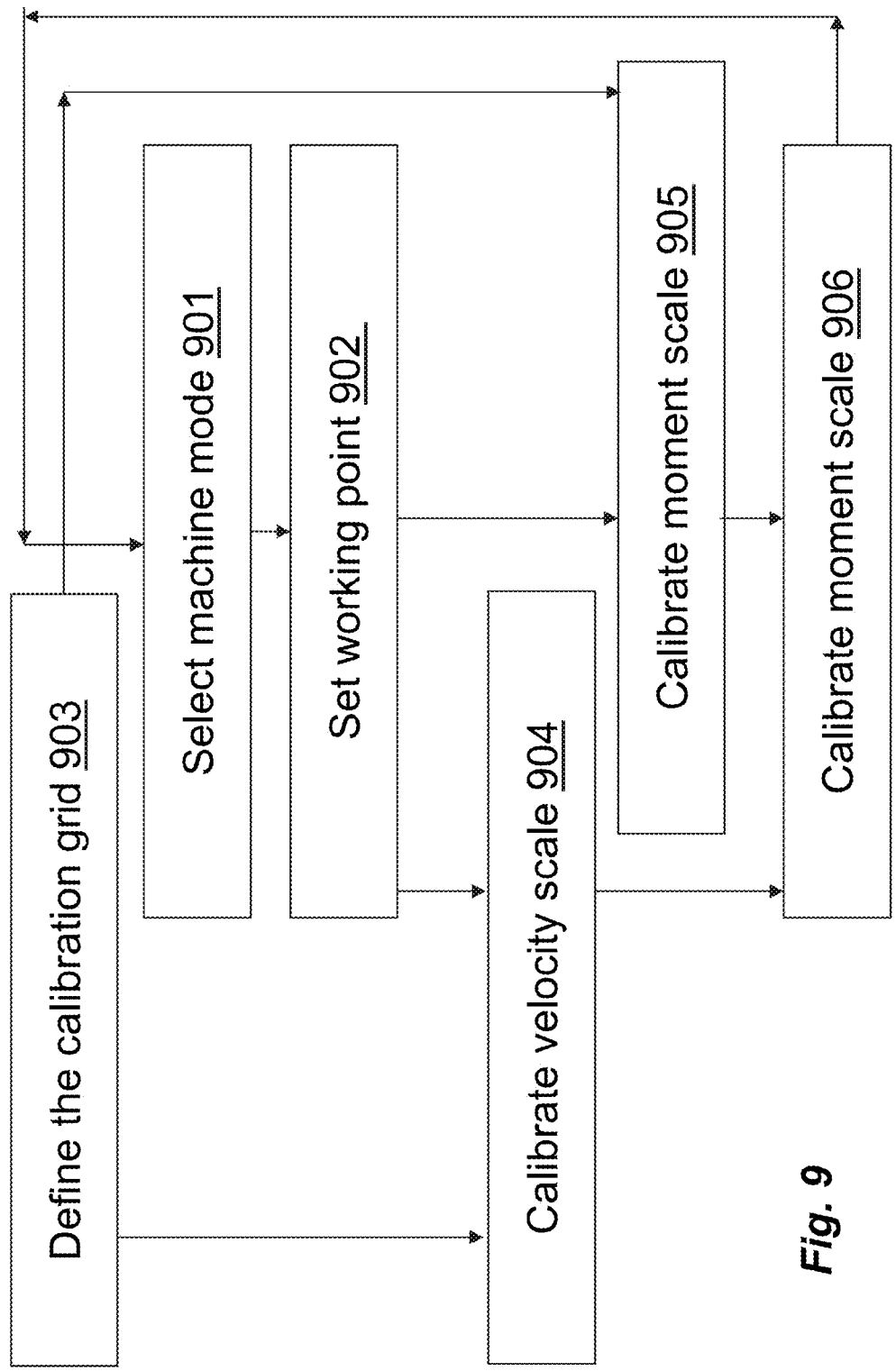
FIG. 9 illustrates a method of actuator calibration according to an embodiment of the disclosure.

FIG. 9 illustrates a flow chart of a method for machine calibration, according to an embodiment of the disclosure. The method is performed prior to system assembly. The system used for machine calibration is shown in FIG. 5. In step 901 machine 103 controlled mode is selected. The machine can function as a motor or as a generator, so it can be calibrated for positive and negative moment and velocity according to the four quadrants described in FIG. 5. In step 902 the working point from the set available on the curve are selected and in step 903 the calibration grid is defined. The calibration grid is a set of commands sent from the computational device 306 to the controller 101 in order to change the velocity and the moment at the machine shaft 109. The calibration grid can be preset prior to this calibration process, which is why it is shown out of sequence. The number of commands for velocity grid is equal to the number of commands for the moment grid. For example, if calibration is performed in five working points, five current commands set in step 903 are sent to the driver 102, corresponding to currents of, e.g., 1 mA, 2 mA, 3 mA, 4 mA and 5 mA. For each current the velocity without load and moment without motion are measured in steps 904 and 905. This is done by applying an accurate force/moment to the shaft and recording variations from zero velocity. If the current grid defined in 903 includes twenty points, then the steps 904 and 905 are performed with twenty points, etc. Step 904 is the velocity scale calibration. For a calibration grid 903, velocity is measured by external measurement equipment on the machine shaft 109 with constant moment by applying a constant load. Step 905 is the moment scale calibration. For a calibration grid 903, moment is measured by external measurement equipment on the machine shaft 109 with constant velocity. The moment measured by 118 is independent of the internal control loop of 101. In step 906 machine calibration curve 501 is generated. To this end, for each point in calibration grid 903, the relevant velocity and moment value are indicated on the plot. The curves in plot 501 enable operating the controlled machine with input from 306 and output measured on the machine shaft 109. The curves 501 are generated for all relevant machine modes and working points (WP1-WP3 are examples of three work points, but the inventive system is not limited by the number of work points) using automated setup system, such as that illustrated in FIG. 5. If the machine is to be operated in a single mode, then only one curve is needed; however, generating several curves provides flexibility in operating the machine in various modes.

Figure 10:
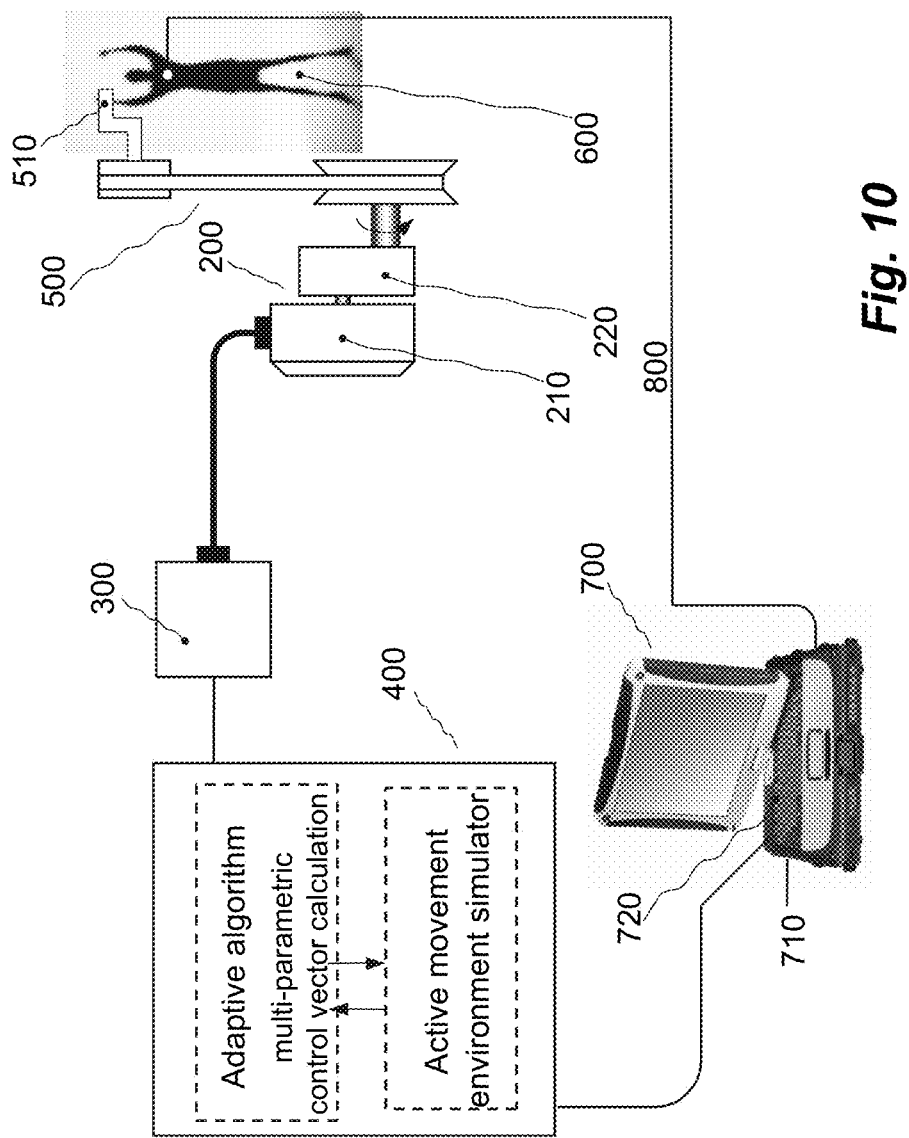
FIG. 10 illustrates a general block diagram of an intelligent dynamic platform with multi-parametric control, as an exemplary use of the present disclosure.

FIG. 10 illustrates a general block diagram of an intelligent dynamic platform as an exemplary use of the present disclosure. It is based on an electric machine 210 (e.g., brushless motor with permanent magnets) with compatible driver 300 operating in 4 quadrants (i.e., velocity-moment quadrant shown in plot 501 of FIG. 5) and coupled with a mechanical transmission 220, forming together a 4-quadrant actuator 200. The transmission output is mechanically connected to an ergonomic interface 500 converting the rotation of the transmission 220 to a desirable movement trajectory of mechanical lever 510 deployed at a work point by a user 600. Persons skilled in the art will appreciate that instead of a user 600, the system may use another machine or mechanical subcomponent in case of a machine/machine interface configuration. It also should be appreciated that alternatively one may consider the interface 500 to be part of the transmission 220, in which case the transmission output is taken to be at the lever 510.

The actuator 200 is managed by a fast-acting controller 400. The controller's core is an active movement environment simulator which makes the actuator 200 supply a desirable movement profile, perceptible by the user 600. The movement at the work point of lever 510 operates according to an adaptive methodology, according to features of the disclosure.

The adaptive methodology is used for control of the multi-parameter dynamic system with unknown behavior. As two parameters of the sensorless actuator 200, velocity (speed) sensor signal on the electric machine axel or transmission axel is detected. A priori information of constant force/moment of the actuator 200 versus velocity is used for force/moment calculation. The adaptive process includes different forms (for different applications) of physical summary of applied force/moment components on the work point, which includes user activity, actuator 200 activity (internal) losses and environment (external) effects. The adaptive process consists of four configurations in accordance with 4-quadrant specifications of the used actuator. The prediction and verification method is used for identification and control of the multi-parameter system, where velocity values collected from physical sensor with known scale, but force (moment) value at work point is calculated from the physical summary. Scaling of this force/moment value was performed a priori by force measuring in number of platform steady-state positions of different force values or by dynamic measurement device.

To provide a pre-running or an instant regulation of the movement forming process, the platform interfaces with a user console 700 providing both comfort information input and instant process monitoring. These information might be part of the active environment simulator component of the controller 400. In an example embodiment, a cyclist training on a bicycle exercise machine/bicycle simulator might use external temperature, humidity, road condition/track condition etc. as inputs for the active environment simulation. The console may be optionally connected to external information and control resources through a remote channel 710 (e.g. intranet, internet and the like). Besides it, to improve the results, the user physiological sensing 800, connected to the console 700, may be applied. If the console 700 constitutes a computer unit 720 then the controller 400 may be implemented as a software tool. An additional advantage is that the bicyclist can use his own bicycle to 'train' the system to be the most efficient for his practice.

Prior to each operational session (i.e., re-configuration), the platform without a load may be run through specific movement simulation profile. During this pre-running procedure the controller collects the information 102 used to extract an array of the existing characteristics. The platform, environment and user parameters extraction is supported by "Pre-running Parameters Definer" module and used as input elements for operation session control.

During operational session the controller instantly receives from the actuator 200 essential movement data. It includes, at least, instant information on speed. The console 700 which is used both to pre-set the main platform, environment and user characteristics and to monitor this characteristics, may exchange information with a "Personalization & Tuning" module.

Embodiments of the disclosure also provide for multiple-parameter control for energy exchange systems including sensorless actuators (and other system components), the multiple parameters being arranged in a matrix form in certain embodiments. The integration of the sensorless actuators allows multi-parameter dynamic compensation of internal and external effects that cause deviation from normal system behavior, as well as variation of control signal based on load dynamics. One non-limiting illustrative example of a system where multi-parameter control is useful is in electromechanical multidirectional system, such as a robotic arm with multiple joints that do not have sensors at the points where the forces are applied. Another example is energy balance in a multi-sourced systems, i.e., more than one energy sources are applied at the points of action. Active/passive systems, such as motor-vehicle systems with different power actuators and transmissions to the wheels (e.g., hybrid cars) and without force sensors at the point of wheels contacts with the road are other examples of a system having multi-parametric control.

The multi-parameter control system may also be applied to a hydro-chemical system with separate actuators for chemical materials, temperature control, liquid flow, etc.

Figure 11:
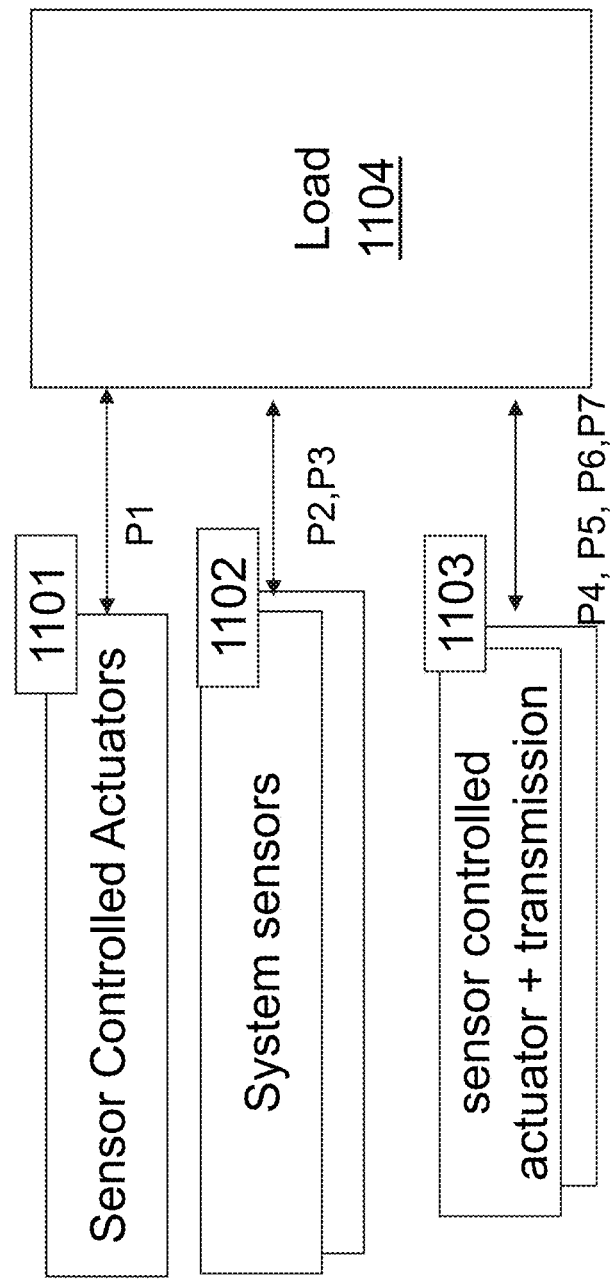
FIG. 11 illustrates a typical design of the conventional multi-parameter control system.

To better understand the features of the inventive multi-parameter control, a short description is provided herein of a conventional multi-parameter system, as illustrated in FIG. 11. System control is generally performed in accordance with multi-parameter control vector in points of action (also referred to as "active points") as applied to load 1104. This may be, for example, a CNC machine where velocities and forces are measured in all movement directions taking into account the materials and instruments, quality indexes and physical conditions of surface at the point of contact. The conditions at the active points may be variables, and many a time are unknown and not measurable. The real time control of most existing multi-parameter systems with prediction control is based on a model developed a-priori using algorithms and/or periodically measured system level parameters, i.e., using off-line system internal and external instruments and/or information sources. Block 1101 represents sensor-controlled actuator, i.e., actuator with sensors for system level parameters, providing real time information and regulation of relevant system interface represented by parameter P1. Block 1102 represents system level sensors at active points that provide real time information related system functionality, quality, and other aspects, required for system level control (represented by P2, P3). Block 1103 represents sensor controlled actuator and transmission. Here, the control loops provided at the actuator output to the transmission and the transmission output connected to load 1104 are not measured in real time, but are based on periodically measured/calibrated values. P4, P5, P6 and P7 are parameters for sensor controlled actuators and transmission.

Figure 12:
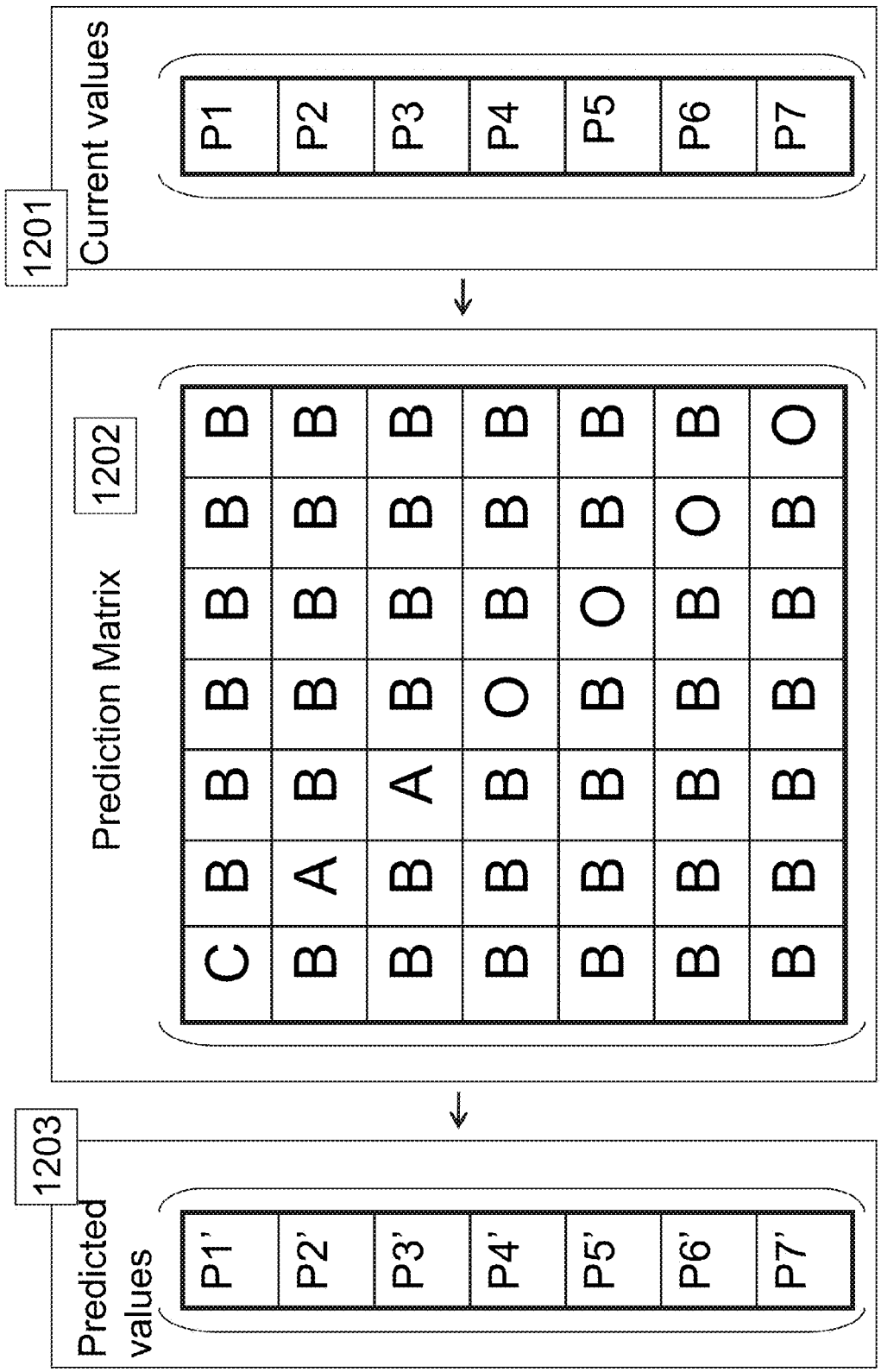
FIG. 12 illustrates a typical design of prediction matrix, which may be used with the state of the art multi-parameter control system illustrated in FIG. 16.

FIG. 12 presents a typical design of prediction matrix, which may be used with the conventional multi-parameter control system illustrated in FIG. 12. There are many types of prediction methods and associated matrices. In this example, system interface parameters are positioned at the matrix diagonal. This typical design is presented as an example in order to assist in illustrating the differences between conventional control methods and the inventive system. In FIG. 12, Block 1201 contains the current values of the multi-parameter control vector, comprising parameters (P1, P2, . . . P7) as measured or otherwise provided by sensors or other information means. For a typical system, such as presented in FIG. 11, parameters P1, P2, P3 are provided by sensors in real time; while are P4-P7 are provided by non-real time measured information. Block 1202 is the prediction matrix and contains data and mathematical calculation by different prediction methods. The values in the diagonal of the prediction matrix support calculations of the vector values, while the rest of the cells contain relative values. Cells A calculate expected values of system sensors parameters, cells C received or calculated expected values of sensor controlled actuator parameters, cells O contain periodical (non real-time) information about input values of relevant parameters, cells B calculate different values in accordance with the method in use. Block 1203 is the predicted values (P1'-P7') of the multi-parameter system vector that are provided in different forms by different prediction calculation methods/matrix.

Figure 13:
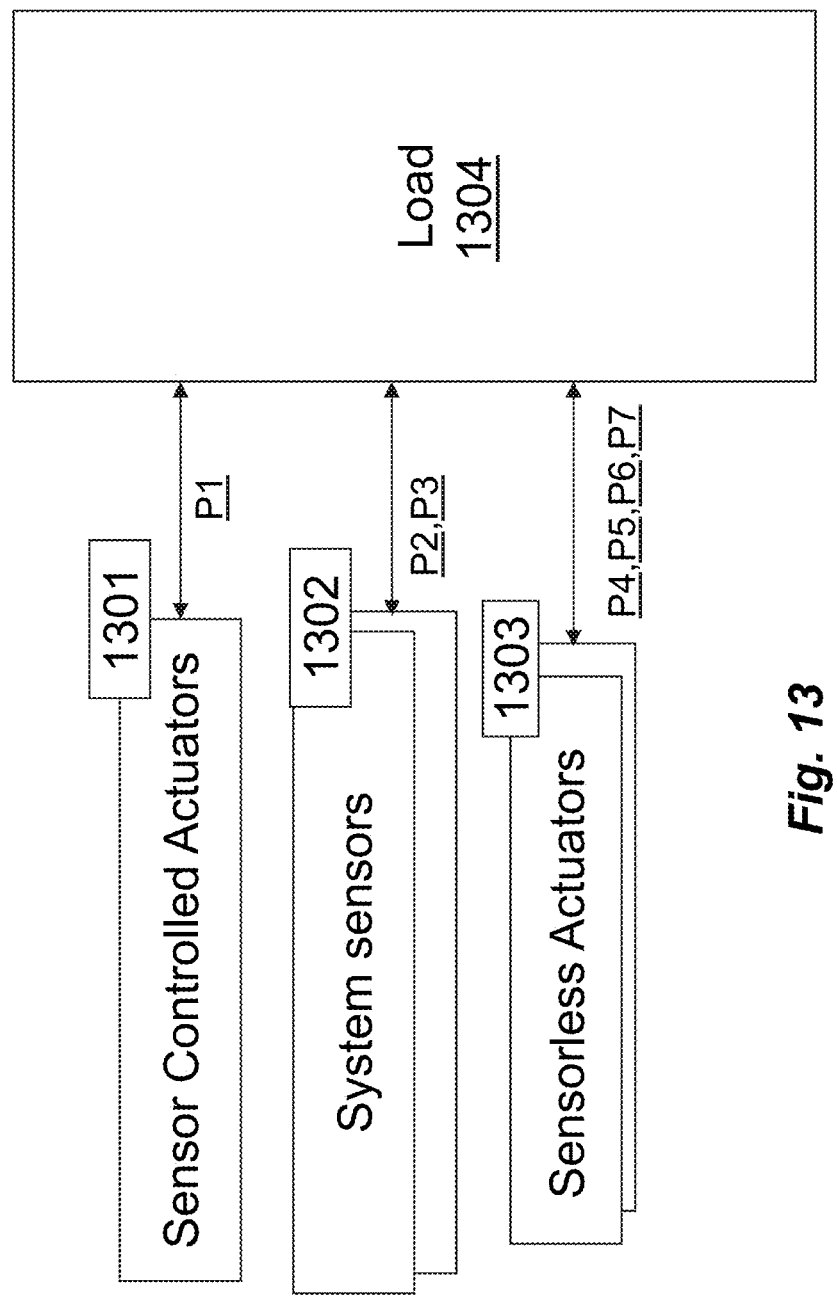
FIG. 13 illustrates an embodiment of a sensorless multi-parameter control system in accordance with the present disclosure.

Turning now to the inventive system, FIG. 13 represents an embodiment of a sensorless multi-parameter control system in accordance with this disclosure. In this embodiment, the system level control is performed, as in conventional systems, in accordance with multi-parameter control vector of parameters at the point of action or "active point". However, in this embodiment the sensorless actuators provide real time controlled parameters for system level control using predefined curves to calculate parametric values.

In FIG. 13, Block 1301 is the sensor controlled actuator, i.e., actuator with sensors for system level parameters, and provides real time information and regulation of relevant system-load interface required parameters (P1). Block 1302 represents the system level sensors that provide real time information related system functionality, quality and other aspects at the active points, required for system level control (P2, P3). Block 1303 represents the sensorless actuators that provide system level real time parameter control for system required parameters P4-P7. The changed real time information status increases the system testability and controllability. Block 1304 represents the load, i.e., a certain system for which we are devising a sensorless control system, with a multi-parameter interface.

Figure 14:
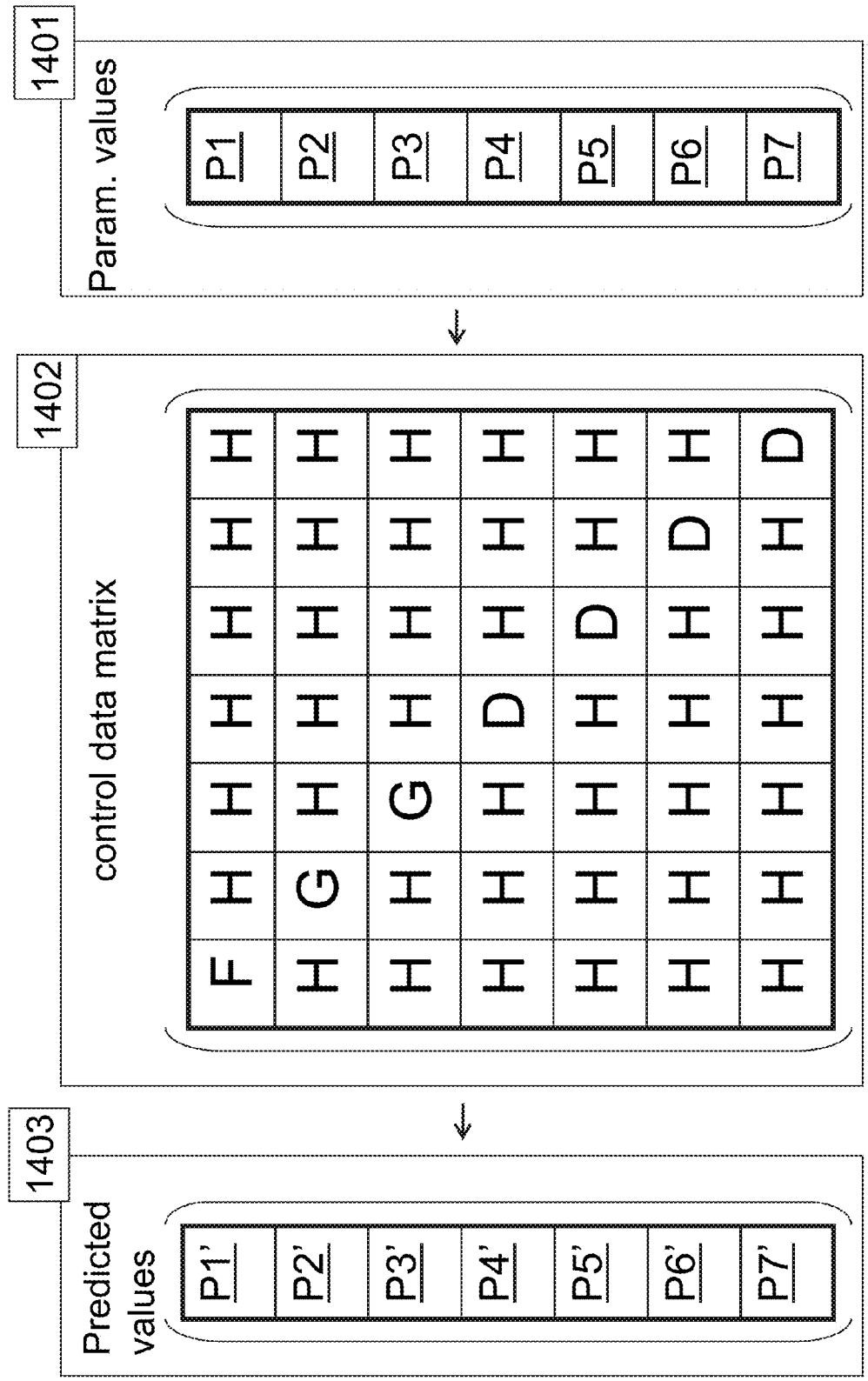
FIG. 14 illustrates a general structure of proposed Control Data Matrix according to an embodiment of the disclosure.

FIG. 14 illustrates a general structure of proposed Control Data Matrix according to an embodiment of the disclosure. This matrix facilitates data preparation and processing to generate the control vector having parameters P1'-P7' derived from collected parameters P1-P7. An example of data processing and calculation of the proposed method are presented below, so as to illustrate the changes between the inventive method and the commonly used method, such as that presented in FIG. 12. The structure of the control data matrix is similar to the predicting matrix 1202 with the following changes, namely, instead of type C entries, here type F are used, instead of type A entries, here type G are used, instead of type O entries, type D are used, and instead of type B entries, type H are used. Integration of sensorless actuators provides a basic set of data elements, which includes an associated diagonal matrix cells D. These include current and predicted dada, and different constant and coefficients elements, that are used for sensorless actuator control. For other cells (F and G) on the diagonal of control data matrix, the existing data as provided by system sensors and sensor controlled actuators, is transformed in similar fashion to the set of data elements provided by the sensorless actuators. By doing that we are preparing a basic set of data elements of diagonal cells for the next calculation and analysis. Non-diagonal matrix cells H are used for calculation of relative, current and predicted values and their analysis for control procedures. Multiplied and verified diagonal matrix data provides close to maximum information and analysis preparation, that increases controllability. The basic set of data elements that were obtained as a result of the previously described data preparation and analysis are intended for further calculations for the benefit of the control procedures. These control procedures include operation control, support control, and improvement control.

In FIG. 14, Block 1401 shows the values of the multiple parameters to be used to calculate the control vector, the parameters measured or otherwise provided by sensors or other information means. For a typical embodiment of the system, e.g., such as presented in FIG. 13, parameters P1, P2, P3 are provided by sensors in real time and P4-P7 by sensorless actuators. In general, sensorless actuators provide two-parameter control of power at active points, and/or achieve energy balance at the active points. The multi-parameter vector is a result of integration of all energy sources and loads associated with the active points.

Each energy source is represented in multi-parameter vector by two parameters, and, together with loads constitute static and dynamic conditions to be controlled parametrically. As a result, multi-parameter vector perform energy balance of all integrated sources and loads with real-time power flow parameters control.

Block 1402 is the modified control data matrix tabulating control data representing current and predicted values of the parameters. Cells D includes current and predicted values of sensorless actuators, and, cells G and H includes current and predicted values of real time parameters, provided by system sensors. Cells H includes current and predicted relative values and provide data for follow-up analysis and compensation information for integrated control. Predicted values of the parameters P1'-P7', as shown in Block 1403, are used to calculate the control vector that determines the amount of energy to be exchanged at the active points of the energy exchange system.

Figure 15:
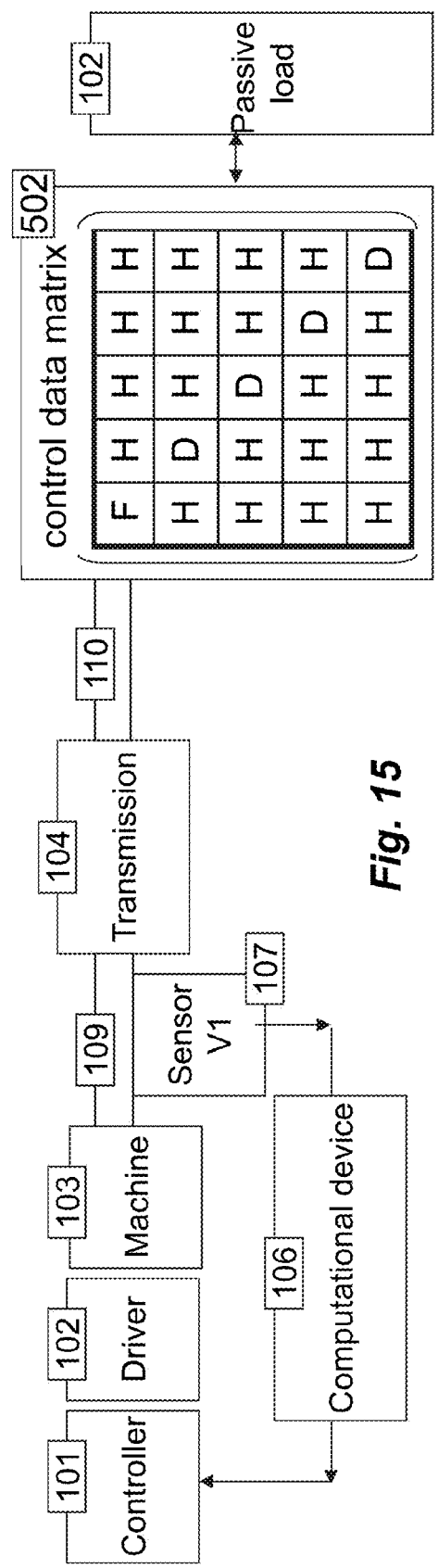
FIG. 15 illustrates an embodiment for system parameter calibration, according to the present disclosure.

FIG. 15 illustrates an embodiment for system parameter calibration. For example, transmission shaft 110 of one of sensorless actuators coupled with total system passive load 102 and control data matrix 502, such as the matrix 1402 is used for calibration. As a result for each sensorless actuator an external losses component is defined using an appropriate algorithm.

Figure 16:
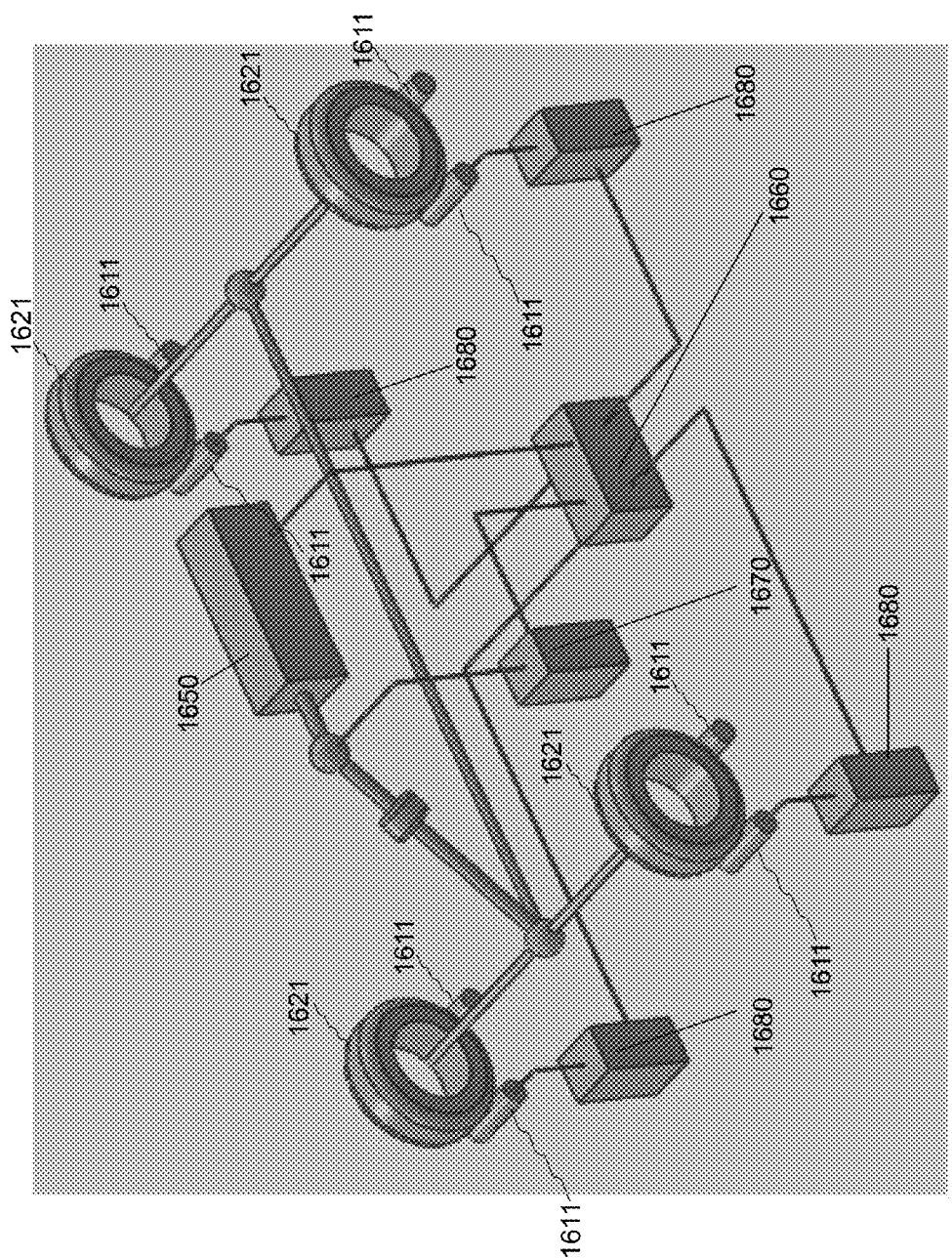
FIG. 16 illustrates a Vehicle Road Simulator/Tester system, as an example application of the present system.

FIG. 16 presented embodiment of "Vehicle Road Simulator/Tester" (VRST) for one, two or four wheels. This configuration is also suitable to measure the engine performance without actually driving the car on road. In general, the number of simulator/testing components may be one (i.e. for motor-cycle having one axle connecting the two wheels), two or four. Number of vehicle drive actuators is equal to number of drive sources (one or two). All controllers are integrated with multi-parameter system controller. Roll (s) 1611 have a non-slip contact with wheel(s) 1621 and provides work point (similar to active points, as defined before) for external and internal sensorless actuators. Roll(s) and wheel(s) contact with radial force of a fraction (e.g., one-fourth) of the weight of the associated vehicle (or more accurate—according to weight allocation in normal horizontal static position). An external sensorless actuator includes one or more rolls 1611 that support a particular wheel 1621, a controlled electrical motor 1680, a transmission from motor shaft to roll shaft (together with roll provide external sensorless actuator transmission), a motor shaft velocity sensor and a controller that provides abilities as per the controller 400. The controller may be part of the central controller 1660. An internal sensorless actuator includes one of the wheels 1621, a regulated vehicle engine 1650 controlled by motor 1670, all transmission elements from the motor shaft to wheel shaft, vehicle motor velocity sensor(s) and a controller that provides abilities as per 400. This controller may also be part of the central controller 1660. Two parameter of external sensorless actuator at corresponding work points and two parameters of internal actuator at corresponding work points are integrated in multiparameter sensorless control vector, calculated by the central controller 1660. For two or four wheels, internal sensorless actuator of each wheel includes transmission elements from wheel shaft to vehicle motor shaft. Multi-parameter control vector includes at least two parameters of internal and 2×2 or 4 parameters of external actuators. Multi-parameter controller 1660 is similar to a system as shown in FIG. 13. Different drive scenarios may be performed with different environment (from slips to high acceleration with varied road situations.)

Figure 17:
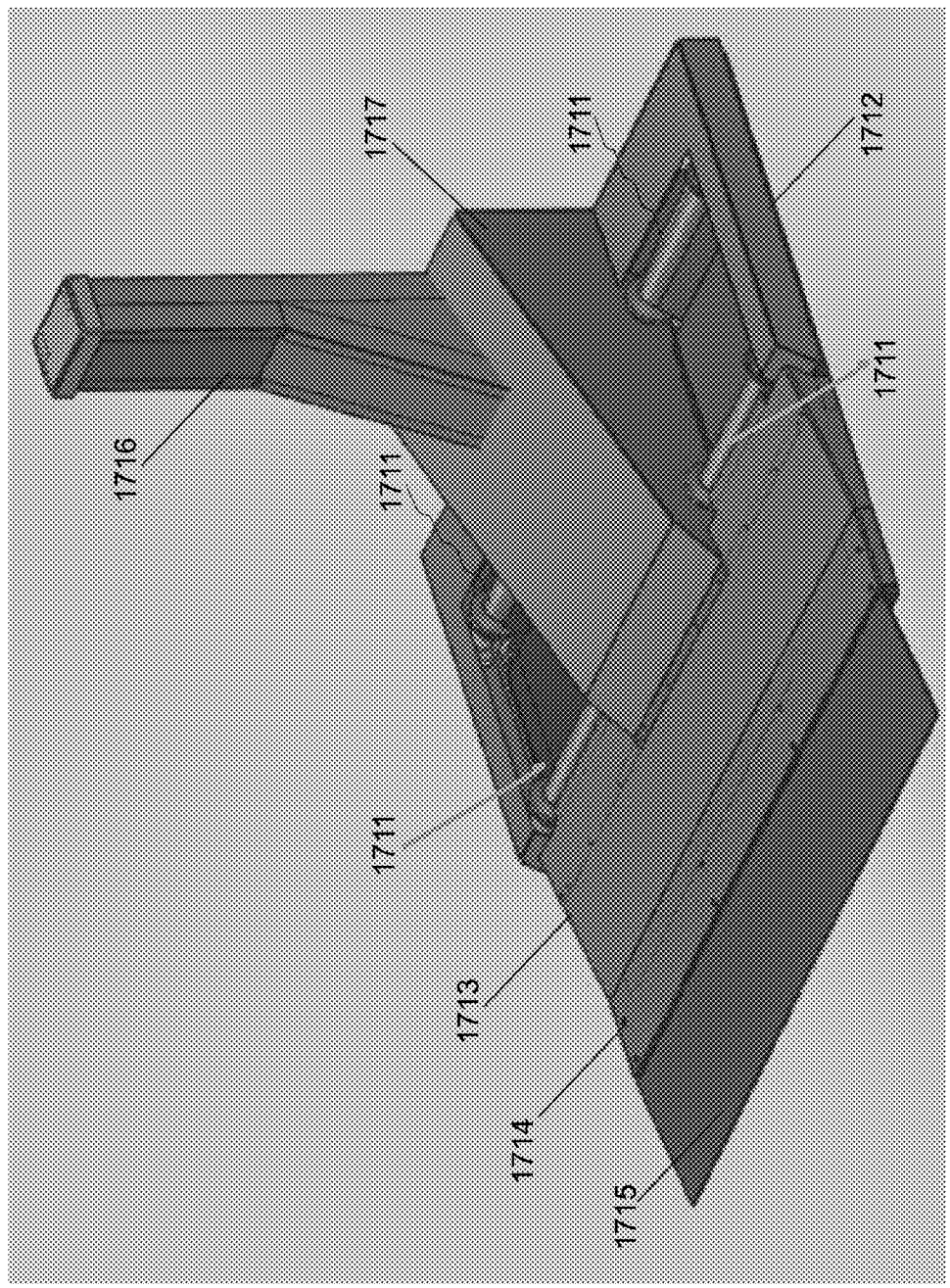
FIGS. 17-19 illustrate embodiments of a Wheelchair Simulator/Tester system, as another example application of the present system.
Figure 18:
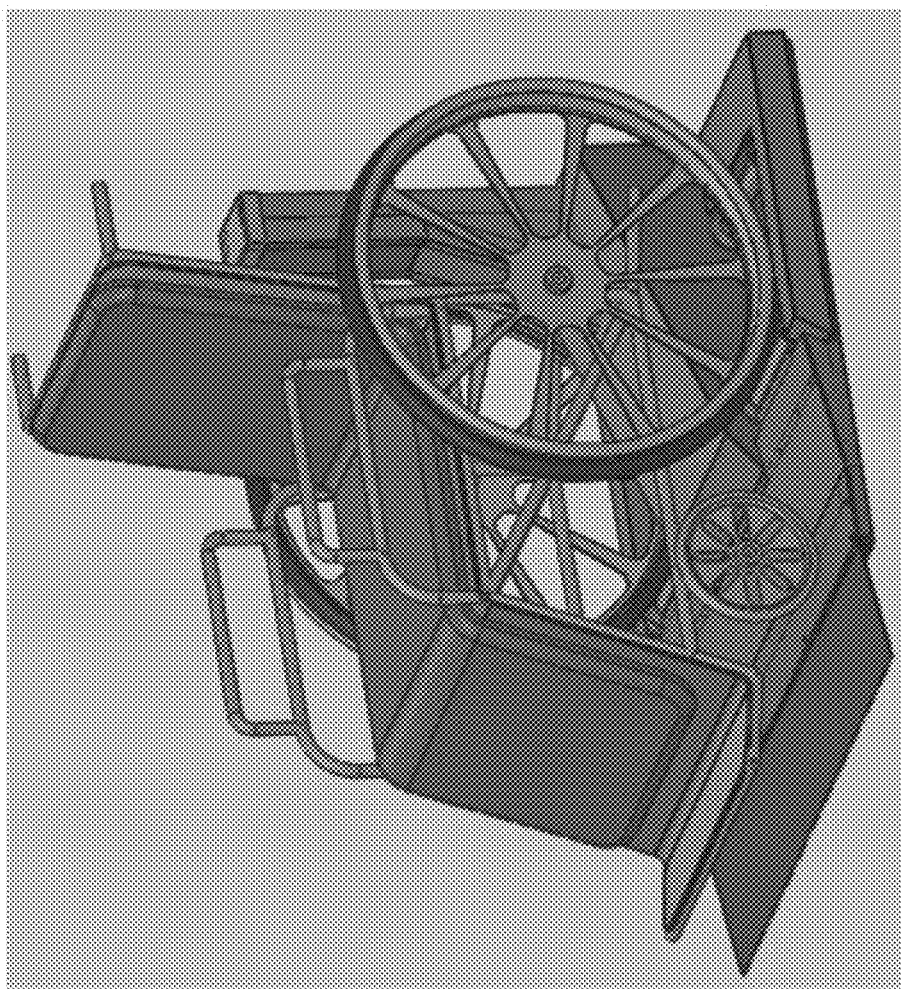

FIG. 17 shows a dynamic platform used to simulate/test a wheelchair. The wheelchair (shown in FIG. 18) is engaged to the platform using the rolls 1711. The design of the base of the platform may vary, including a frame 1712 and multiple subsections 1713, 1714 and 1715 joined together. Other structural components 1717 and 1716 are designed to support and engage various parts of the wheelchair, as shown in FIG. 18. Energy balance is achieved at work points on the rolls 1711 through which the wheelchair and the platform transfer energy to each other based on real-time multi-parametric control, as described in this disclosure. Rather than acting as a passive load, the wheelchair may act was an active load also when a user is using the wheelchair and changing the energy imparted to or drawn from the dynamic platform at the active points on the rollers. Additional man-machine (in this case, user-wheelchair) active points may reside on the wheelchair itself, which are taken into account when quantifying energy exchange at the machine-machine active points on the rollers.

Figure 19:
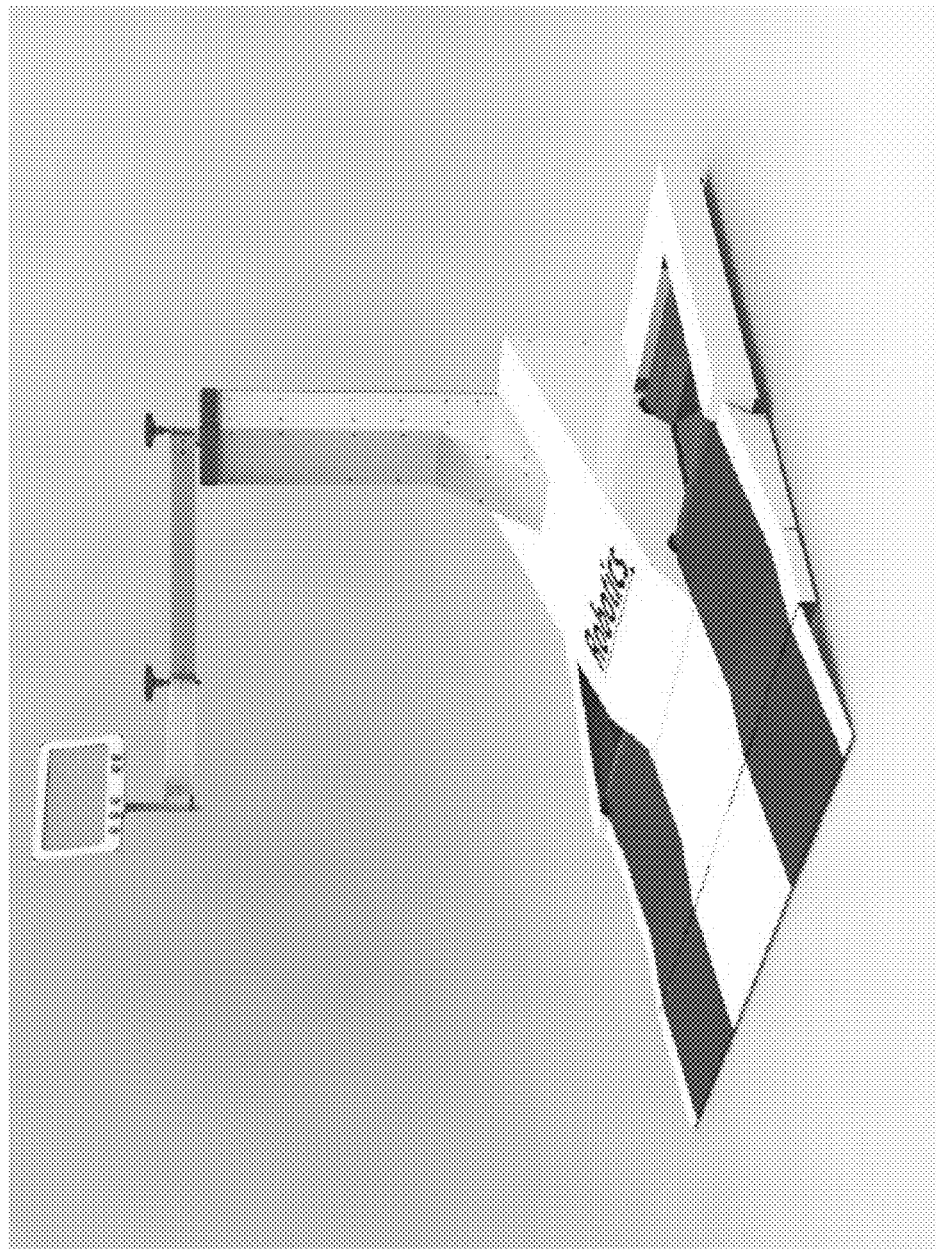

FIG. 19 shows another embodiment of the dynamic platform (similar to the dynamic platform of the wheelchair simulator) with an integrated computer system for calibration/control.

According to one embodiment, the sensorless multiparameter control system may comprise three control modes: operation control, support control, and improvement control. The operation control is a system control for regular operation modes, that provides multiparameter command vector within operation limits of its controlled parameters and applies decisions in accordance with control and application "rules" incorporated in a system control that provides recovery to normal operation under abnormal "operation control" block and "recalculate control data" block. The Support Control Algorithm normal is applied when a problem situation is detected, when at least one of the controlled parameters is within the range of a defined "support limits". Support control applies decisions in accordance with control and application "rules" incorporated in "support control" block and "recalculate control data" block. Improvement control is a system control which allows potential system growth and/or controlling aging degradation. Improvement control applies process in accordance with control and application "rules" incorporated in "improvement control" block and "recalculate control data" block. These blocks and their functionalities are described with respect to FIG. 20.

All three stages have a similar mechanism of data processing and prediction (recalculate control data) and are followed by different mechanisms of decision making by algorithm based controls. Algorithm based controls provides the commands for system compensation and correction of the control method. The operation control stage is based on the operation control algorithms. Operation control algorithms allow system level parameter compensation for parameters compatibility and system quality indexes, within operation range of parameters.

The support control stage activates integrated support functions and/or system reconfiguration in any abnormal excursions and problem situations. To this end, the cells in the support controller are compared to problem situation limit values. In case of cells parameter values exceeding the limit values, an expert system activates the support functionality. The system then undergoes a reconfiguration and correction process, which is intended to return the system to its normal operational status.

The improvement control stage includes data gathering for detection of, for example: a) effective implementation of growth potential: systematic analysis of system data (for example: problem situation mode rate, actuators useful factor, parameters values concentration factor, etc.) and possible improvement area detection, b) long-term trends associated with system aging and numerical stability degradation. Then, the external growth decision mechanism and improvement application process control are applied in order to improve system performance and/or effectiveness.

Figure 20:
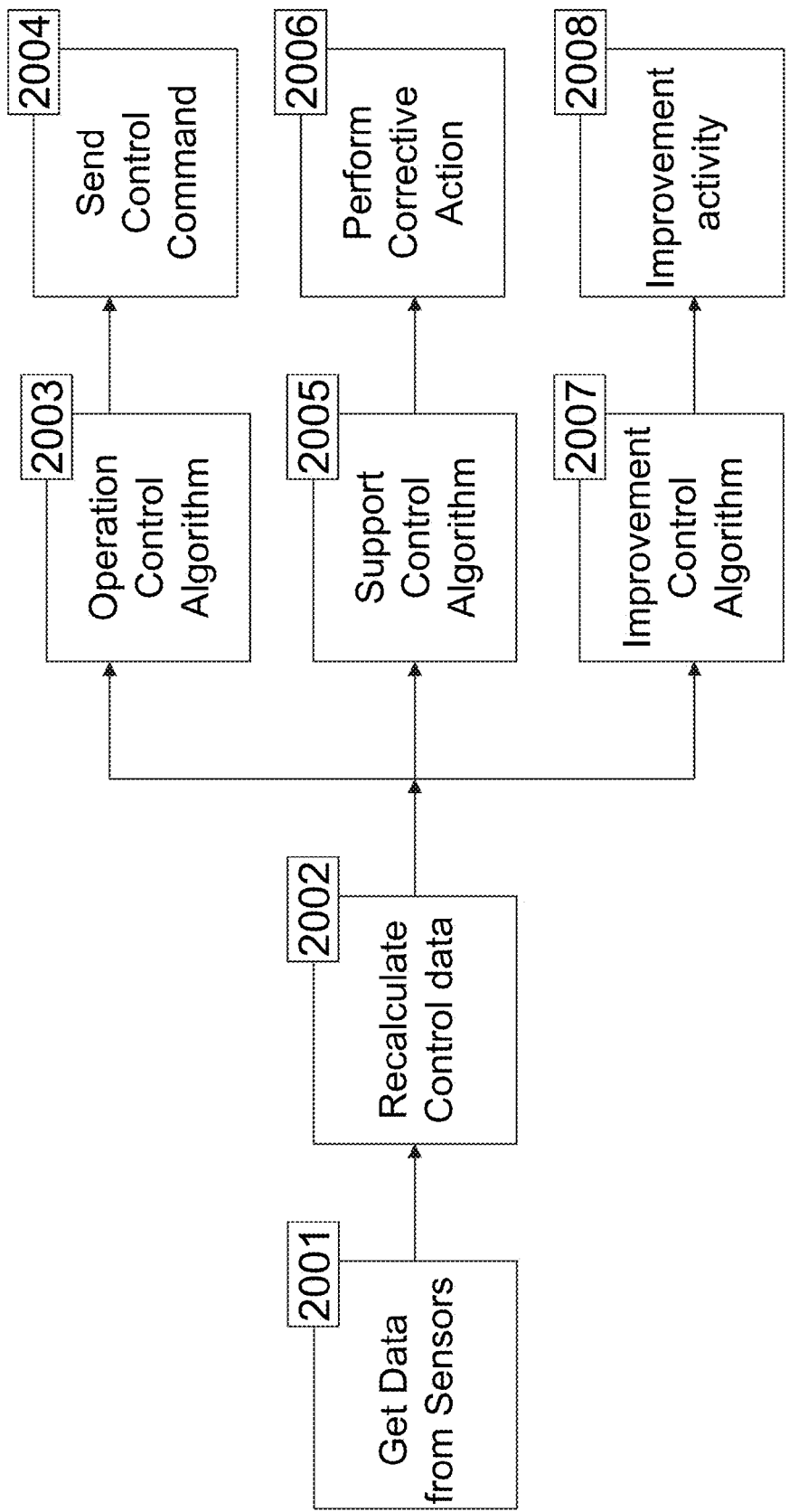
FIG. 20 illustrates three-stage operation mode control method according to an embodiment of the disclosure.

FIG. 20 illustrates a predictive control method according to an embodiment of the disclosure. The proposed control method of this embodiment provides a set of tasks and procedures. Sensorless actuators provide many parameters of the multi-parameter control vector of the system level control, by system level information and compensation. Other parameters of the multi-parameter control vector are controlled by information and compensation ability of sensor controlled actuators and system sensors. The real time detected information is used for calculations, analysis and decisions for target achievement by control activities. The information and compensation ability cover desired system required performance and quality parameters within loads, external and internal effects on parameters deviation and limits.

Every application is described in sub-system level by functional and physical configuration. Groups of parameters in the system multi-parameter control vector are compatible to status and behavior of each sub-system. This compatibility allows us to control the subsystems as well, because each parameter reflects on the performance of subsystems connected to the system. Sub-system configuration includes physical, functional and parametric status, values and deviations. Multi-parameter control in present disclosure provides control solution for "energy balance" of different systems. Sub-systems may be connected in "points of work" or "active points" within serial, parallel or mixed configurations. Non-limiting examples of the applications of the present disclosure include, but are not limited to, for example: vehicle road simulator, multi-trainers, rowing exercisers, treadmills etc.

Depending on the application, the system of the present disclosure may be calibrated in various ways.

In a first calibration procedure, each sensorless actuator is calibrated for internal losses as defined before in this disclosure. Special sub-systems, with only transmission functionality, may be included in sensorless actuator configuration. In such cases, the sensorless actuator calibration procedure may be performed in number of steps, where each serial component of transmission is calibrated step by step and provide additional component for internal losses calculation in algorithm. Special sub-systems with complex functionality is defined as external and integrated as a component in calibration procedure 2.

In another calibration procedure, passive load calibration performed for each one of the sensorless actuators. Passive load combined from all sources, except under calibration, and loads (includes special sub-systems) in non-operated mode (system is complete integrated). Procedure is described in the U.S. Pat. No. 8,332,071. This step provides external losses for each sensorless actuator.

Once calibration is done, three stages of control are provided: 1) operation control for normal operation; 2) support control—for system recovery in problem situation with internal and external system support abilities activation; 3) improvement control—for long time system service effectiveness in techno-economical environment.

All three stages have a similar mechanism of data processing and prediction (recalculate control data) and are followed by different mechanism of decision making by algorithm-based control. Algorithm-based control provides the commands for improved system compensation for all system and support corrective activity. The advantages of each one of the used processes have multiple effects on the most important abilities. The mixed command from operation, support and improvement controllers is sent to the actuators to be executed.

Returning to FIG. 20, in Block 2001 the system gets data from the sensors-sensor's data is provided from three major groups: sub-system actuator sensors for real time system level control needs (e.g., P1 in the example of FIG. 13), system quality sensors for detection and correction results of system performance (P2, P3 in the example of FIG. 13), and other system level sensors which may be needed for the application (not included in FIG. 13). The sensors' data is received in the matrix diagonal cells (G and F in FIG. 14) after transformation to "recalculated control data" (1402) format.

Block 2002, i.e. the block that recalculates control data, receives current values (Block 1401 in FIG. 14) of parameters from Block 2001. Recalculate control data 2002 performs all calculation tasks and processes as defined in the description of FIG. 14. Block 2002 supports configuration and reconfiguration of data and identification, calibration procedures and other tasks. Block 2002 provides data exchange with blocks 2003-2008 and prepares data for the algorithms of operation control 2003, support control 2005 and improvement control 2007. The "recalculate control data" 2002 block may be a software programs package, hardware, or a combination of software and hardware, with interface to blocks 2001, 2003, 2005 and 2007. Block 2003 represents "operation control", block 2005 represents "support control" and block 2007 represents "improvement control, as well as for commands and actions. Depending on the mode of operation, a control command is send for normal operation in block 2004, corrective action is performed in block 2006, and system improvement activities are performed in block 2008.

System configuration and reconfiguration identification is provided for the operation and support control algorithms 2003 and 2005. Physical and functional configuration in the sub-system level is compatible with system level parameters. The sensorless multi-parameter control provides real-time configuration identification, operation modes regulation, reconfiguration control and additional tasks.

Operation control 2003 provides operation modes and corresponding algorithms activation. Support control 2005 includes reconfiguration for each problem situation for operation continuity. System calibration includes periodic verification and correction of algorithms coefficients.

Figure 21:
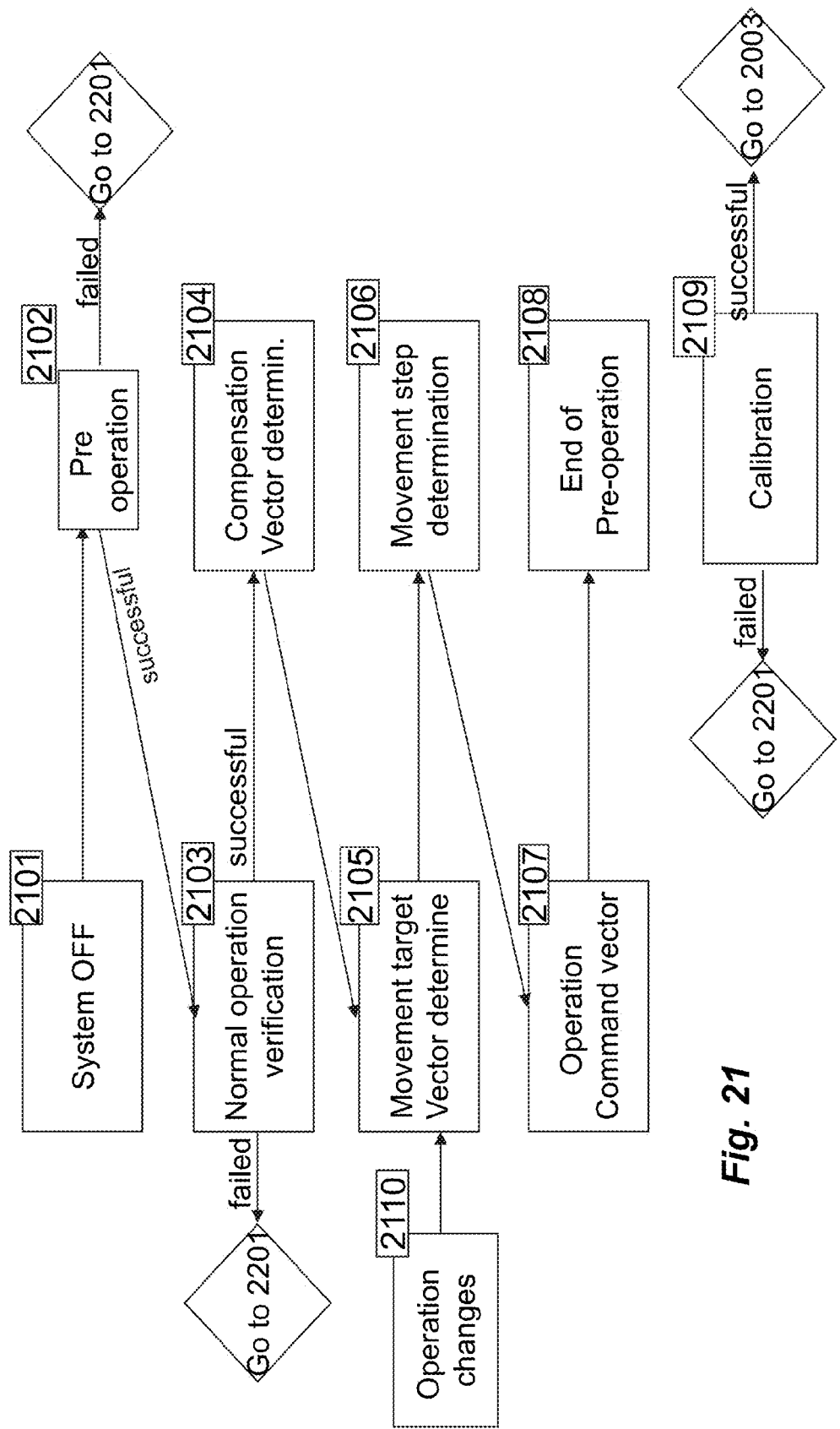
FIG. 21 illustrates the major steps for operation mode control of block 2003 of FIG. 20.

Operation control algorithm of block 2003 performs control process as presented in FIG. 21 and provides control data to block 2004. Operation task begin from pre-operation information. For description purposes herein presented algorithm of one of the applicable control modes for "movement step": constant control step (the same control step time for all parameters in system control vector), one control mode (constant value of parameter change, different for each parameter of the system control vector), linear, comply control quality indexes (accuracy, linearity, etc. for each parameter). "Movement target"—set of "movement step" data elements for operation command vector—provides in accordance with "minimum step number" criteria for achieving "desired operation target". "Desired operation target" is a mixed regulation decision from relevant mission phase/operation mode required functions (mixed operation and support needs).

Block 2004, send control command, transforms control data from 2003 in the format of the addressed item and sends control commands to actuators 1301 and 1303. Block 2005, support control algorithm, provides effective system "return to normal" conditions when problem situation is recorded. For each control step, current and predicted values are verified for operation limits (a-priori defined) and "problem situation" is send to "support control" process 2005 when a limit is exceeded. An "out of operation range" indication of one of the parameters is analyzed for corrective decision. The Support control algorithm 2005 prepares the corrective activation and activates it only when the detected problem situation is verified. For effective system return to normal operation, there are system internal abilities (redundancy, reconfiguration, etc.) and external support abilities (professional, logistic, etc.). Corrective action provides integrated solution of internal and external functionality. These solutions are included in the integrated support procedures. Support control algorithm 2005 provides support control process with data calculation, decision making and corrective commands distribution. One of the indexes for corrective actions is a minimum down time. The proposed method sustains real time system reconfiguration and minimum external support time for down time minimization.

Block 2006, perform corrective action, transforms the corrective commands from 2005 in the format of the addressed items and sends information to support items and commands to operation control algorithm 2003. Block 2007, improvement control algorithm, includes information preparation for external improvement decision making and execution. Information preparation provided by group of dedicated data collection tasks and improvement potential for defined possibilities. Potential improvement messages are sent to block 2008. Additionally, this is a place for system internal improvement decision making and execution, that may be developed using proposed control system and method as platform. Block 2008, improvement activity, transforms messages from 2007 in the format of addressed items and sends information to improvement activities for improvement process management.

FIG. 21 illustrates the major steps for mission phase/operation modes control of block 2003 of FIG. 20. Block 2101, System OFF, represents an initial system state with initial data (in accordance with the application, for example: initial data in "recalculate control data" 2002, current vector 1901 pre-operation values, operation and support limits; or last data of previous operation. Block 2102, pre operation, represents system ON for initial command vector activation, the system functions in accordance with last known target parameter vector. Block 2103, normal operation verification, is performed by comparing to the limit values, for out of normal range. Operation limits are the regular max/min values of controlled parameters. The limits may be changed with operation control modes and targets. If an out of operation range (problem situation) is detected—the process proceeds to support controller algorithm 2201, while if normal range is observed, the process proceeds to block 2104. Block 2104, compensation vector determination, provided by operation algorithm 2003 and recalculate control data 2002.

Compensation vector is sent to 2105 for movement command vector determination. Block 2105 represents movement target vector determination. The target operation value "Movement target" is used for operation control mode (steady-state or transient mode) and movement parameter value calculation. The values send to 2106. Block 2106, movement step determination, is provided in accordance with movement step specification for rules and assumption adaptation, for example: control step time, control modes, control quality indexes (accuracy, linearity, etc.). Block 2107, operation command vector, is the mixed vector of command values for control step. The major components of the command value are the movement target values from 2105 and compensation value from 2103. Target values from step 2105 and compensation values from 2103 are mixed (for example: by summing) and the results are sent to 2102. Block 2108 is the end of pre-operation. The pre-operation steps contain tasks in blocks 2102, 2103, 2104, 2105, 2106 and 2107. Now the system checks if the initial values have been replaced with the operation values: if Yes—go to 2109, No—"problem situation"—go to support control algorithm 2005. Block 2109, calibration, performs one by one actuators activation with passive load for control data adjustment. System parameter calibration ad actuation may be done as shown in FIG. 15.

Returning to FIG. 21, Block 2110 represents operation changes, which may result from different reasons, e.g., the desired operation mode is changed, support control is required (system is in a problem situation), operation target is required, etc. The provided common task is reconfiguration-systematic configuration changes.

Figure 22:
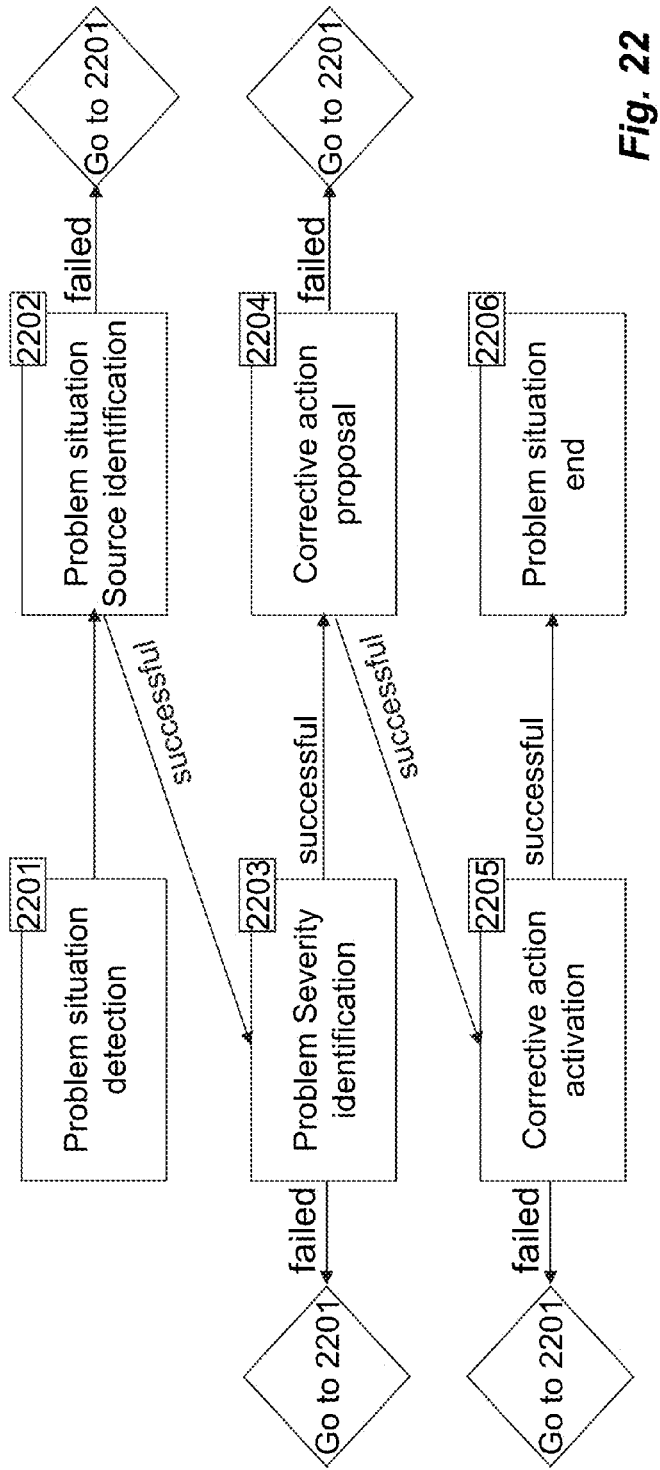
FIG. 22 illustrates an embodiment for the support control process according to the disclosure.

FIG. 22 illustrates an embodiment for the support control process according to the disclosure. The support control process provides control of system inherent abilities, support organization abilities and integration of them—integrated system support, for system recovery to normal operation from problem situation.

Block 2201 performs problem situation detection. Problem situation is identified whenever one of the parameter values is out of its normal operation range. This indication may be received from blocks 2102, 2103, 2109 and others. For short list of situations that are defined as "catastrophic problem" the process returns an OFF command to operation control algorithm 2003 (other methods may be used in accordance with system architecture). For other received problem situations, two parallel procedures are provides: 1) verification of received problem situation during next control step by block 2002 and 2) analysis and preparation for corrective activity by the procedure, provided in the next steps. For example: problem situation "human safety zone" launches "double detection" by parallel detection tasks motor controller and sensorless actuator controller for velocity, force and power safety limits in terms of parameter values and parameter changes.

Block 2202 performs problem situation source identification, to determine the most probable system function and sub-system level physical and functional configuration item causing the problem. The column data from recalculate control data 2002 is used for problem situation source identification by analysis of high correlated variables of detected problem parameter value. Decided (higher probability) problem parameter value is used for problem situation source recognition, finding the responsible sub-system and degraded function. Self-recognition and followed reconfiguration ability increased by high information coverage. "Fail" of identification task followed by return ones or twice with massage to higher decision level. The source information is sent to 2203.

Block 2203 performs problem severity identification, by a-priori analysis and determination of severity levels and problem related groups. Problem severity information is sent to 2204. Block 2204 performs corrective action proposal, identified and distributed for system readiness purposes. Identification and distribution is provided in accordance with a-priori determinations of corrective behavior. Corrective methods may include system self-correction by reconfiguration for normal operation. Block 2205 performs corrective action activation, and is provided when problem situation verified by next control step of 2002. Activation command is sent to 2006 for distribution and to 2206 for end verification. Block 2206, end of problem situation: when system's normal configuration is verified, this is also the end of corrective action.

Figure 23:
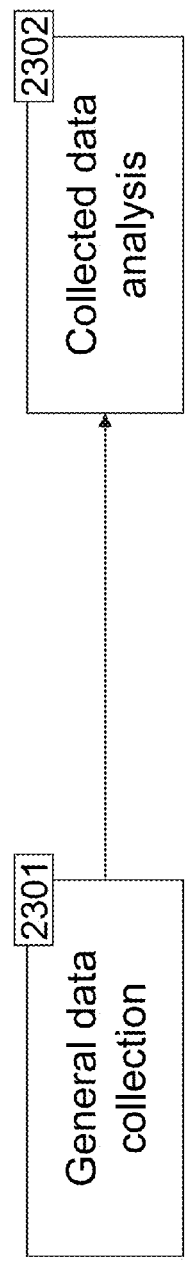
FIG. 23 illustrates an embodiment of the improvement control process according to the disclosure.

FIG. 23 illustrates an embodiment of the improvement control process according to the disclosure, to provide a mechanism for degradation tolerance and/or major system indexes increase. Block 2301 represents general data collector, which provides data collection for dedicated purposes, for example: problem situation reports collection, classification and statistics; parameter stability data collection and statistics, etc. Design approach verification actuators regulation ability verification results are send to 2302. Block 2302, collects data analysis, provides system indexes for improvement or degradation, for example: system down time and sub-system allocation, actuators effectiveness, etc. The results are sent to 2008 for activation of inherent improvement activity and expert group for improvement proposal preparation and followed activation of management group for improvement application implementation.

The present disclosure has been described in relation to particular examples, which are intended in all respects to be illustrative rather than restrictive. Those skilled in the art will appreciate that many different combinations of hardware, software, and firmware will be suitable for practicing the present disclosure. Moreover, other implementations of the disclosure will be apparent to those skilled in the art from consideration of the specification and practice of the disclosure disclosed herein. Various aspects and/or components of the described embodiments may be used singly or in any combination in the server arts. It is intended that the specification and examples be considered as exemplary only, with a true scope and spirit of the disclosure being indicated by the following claims.

What is claimed is:

1. A mechanical energy exchange system, the system comprising:
 a first component and a second component transferring mechanical energy to each other at one or more active points at an interface of the first component and the second component to achieve overall energy balance in the system, wherein the first component comprises:
at each of the one or more active points,
one or more sensorless actuators coupled to the active point; and
a controller for calculating a control vector for each active point based on multiple parameters including at least two characteristic inter-related parameters per sensorless actuator, and at least one additional parameter that comes from real-time measurement by a sensor that controls a regular sensor-controlled actuator,
wherein the multiple parameters from each active point are arranged in a matrix whose diagonal cells represent the real-time measurement data, and the matrix is transformed to recalculate control data that adaptively determines an operational mode of the mechanical energy exchange system even when the system's a priori behavior is unknown;
wherein the second component comprises an active or passive load, and the operational mode is updated by selecting one of a plurality of predetermined multi-parametric calibration curves stored in the energy exchange system that matches the load; and
wherein the calibration curve represents a relationship between the two characteristic interrelated parameters, thereby enabling dynamic measurement of only one parameter to be sufficient to determine the amount of mechanical energy to be exchanged by a sensorless actuator at a particular active point.

2. The system of claim 1, wherein a product of the two characteristic inter-related parameters provides an output power of the respective sensorless actuator.

3. The method of claim 1, wherein the operational mode is one of: a normal operation mode, a recovery mode, and a performance improvement mode.

4. The system of claim 3, wherein a feedback loop is used to recalculate the control vector, wherein the feedback loop includes real-time data collected from the system.

5. The system of claim 1, wherein the calibration curves are periodically updated based on the at least one additional parameter that comes from the real-time measurement by the sensor.

6. The system of claim 1, wherein the calibration curves are generated by performing periodic static load calibration, the static load being varied to collectively span an operational regime in a dynamic load condition.

7. The system of claim 1, wherein the two interrelated parameters are velocity and moment.

8. The system of claim 7, wherein the two interrelated parameters are plotted in four quadrants spanning a two-parametric space.

9. The system of claim 1, wherein the first component of the mechanical energy exchange system is a mechanical structure, and the second component of the mechanical energy exchange system is a human being.

10. The system of claim 9, wherein the first component is one of: a treadmill, a muscle training machine, an exercise bicycle, a wheelchair, a rowing exerciser, a robotic hand, a stepper, an elliptical.

11. The system of claim 1, wherein the first component of the mechanical energy exchange system is a mechanical structure, and the second component of the mechanical energy exchange system is another mechanical structure.

12. The system of claim 11, wherein the mechanical energy exchange system comprises one of: a wheelchair simulator, a motor vehicle simulator, a bicycle simulator.

13. The system of claim 1, wherein the first component is a dynamic platform for intelligently exchanging mechanical energy with the load, wherein each of the sensorless actuators comprises a machine coupled with a mechanical transmission system, wherein the mechanical transmission system carries at least a portion of the mechanical energy produced by the machine at an active point.

14. The system of claim 13, wherein the controller dynamically controls the operation of the sensorless actuator according to an adaptive methodology that determines the control vector for each active point based on a detected load condition at that point.

15. The system of claim 13, wherein the mechanical transmission system comprises an ergonomic interface structure coupled with a transmission shaft.

16. The system of claim 15, wherein the mechanical transmission system further comprises a mechanical lever coupled to the ergonomic interface structure, wherein the active point at which the load interfaces with the transmission system resides on the mechanical lever.

17. The system of claim 14, wherein the detected load condition is a result of a user's activity, the user being the load.

18. The system of claim 14, wherein the controller comprises an active movement environment simulator.

19. The system of claim 18, wherein the active movement environment simulator receives user-specific input.

20. The system of claim 18, wherein the active movement environment simulator receives input related to a generic environment of the dynamic platform irrespective of a specific user and the specific user's activity.

* * * * *